United States Patent [19]

Haville

[11] 4,167,330

[45] Sep. 11, 1979

[54] VELOCITY MEASURING SYSTEM

[75] Inventor: George D. Haville, Little Rock, Ark.

[73] Assignee: BEI Electronics, Inc., Little Rock, Ark.

[21] Appl. No.: 814,131

[22] Filed: Jul. 8, 1977

[51] Int. Cl.$^2$ .......................... G01P 3/36; G01C 3/08
[52] U.S. Cl. ..................................... 356/28; 324/175; 343/112 S; 356/4
[58] Field of Search ...................... 356/4, 5, 28; 343/9, 343/112 S; 324/160, 175

[56] References Cited

U.S. PATENT DOCUMENTS

| | | | |
|---|---|---|---|
| 3,004,219 | 10/1961 | Albert | 343/112 S |
| 3,023,361 | 2/1962 | Conner, Jr. | 343/112 S |
| 3,040,311 | 6/1962 | Segerstrom | 343/9 |
| 3,057,071 | 10/1962 | Sinn | 356/28 |
| 3,413,850 | 12/1968 | Merrifield | 356/28 |
| 3,525,568 | 8/1970 | Dreyfus | 356/28 |
| 3,661,459 | 5/1972 | Aoki | 356/5 |
| 3,689,157 | 9/1972 | Andermo | 356/28 |
| 3,804,517 | 4/1974 | Meyer et al. | 356/28 |
| 3,824,015 | 7/1974 | Petit et al. | 356/28 |
| 4,000,466 | 12/1976 | Scouten et al. | 343/112 S |
| 4,041,293 | 8/1977 | Kihlberg | 324/175 |

Primary Examiner—S. C. Buczinski
Attorney, Agent, or Firm—Burmeister, York, Palmatier, Hamby & Jones

[57] ABSTRACT

The relative transverse velocity between a local station and a zone of reference or observation is measured by providing first and second directional radiation receiving devices at the local station, such devices being aimed along parallel paths extending to the zone of reference. Such paths are spaced apart by a predetermined transverse distance. The first and second radiation receiving means include respective first and second converting means for converting the received radiation into first and second electrical signals. Any transversely moving radiation feature produces corresponding signal features in such first and second signals, such signal features being staggered with respect to time. The lapse of time between such staggered signal features is determined by time lapse measuring means. The velocity of such transverse movement is inversely proportional to such time lapse. The time lapse is preferably divided electronically into a constant which represents such transverse distance and a scale factor, to produce a quotient which is a direct measure of the velocity. The time lapse may be measured electronically with a high degree of accuracy. The received radiation may be either light focused by first and second optical systems, or radio waves received by first and second directional radio antennas connected to first and second radio receivers. The local station may be stationary, in which case the system may be employed to measure the velocity of objects or features in the zone of reference. Alternatively, the local station may be mounted on a movable vehicle, such as a helicopter, for example, in which case the system may be employed to measure the velocity of the vehicle relative to the zone of reference, which may be the terrain over which the helicopter is flying, for example. The velocity measuring system is adaptable to the measurement of the range and dimensions of objects in the zone of reference.

10 Claims, 27 Drawing Figures

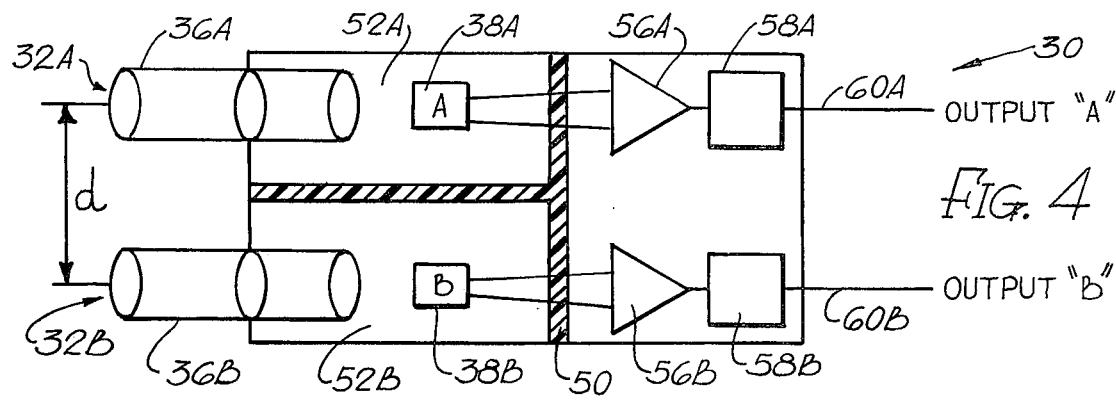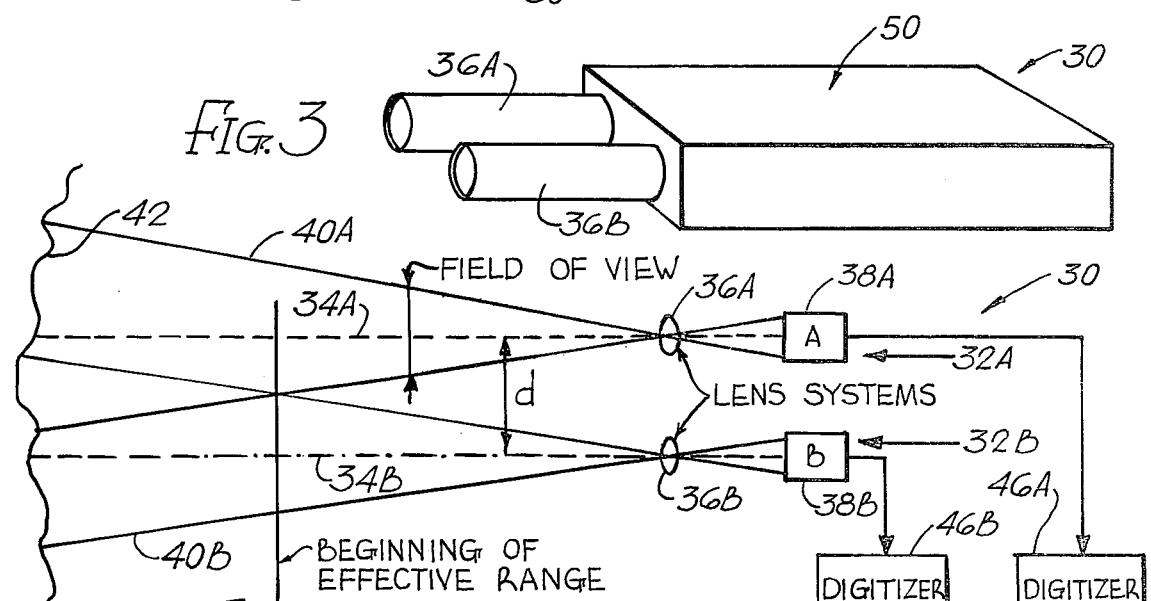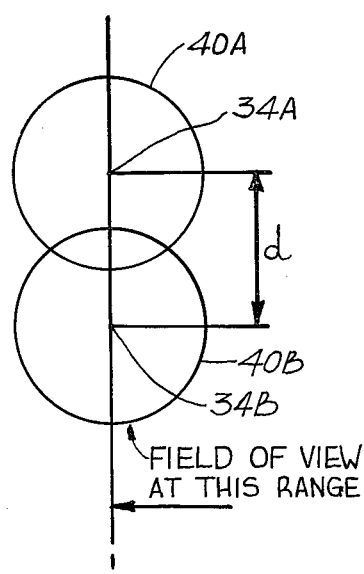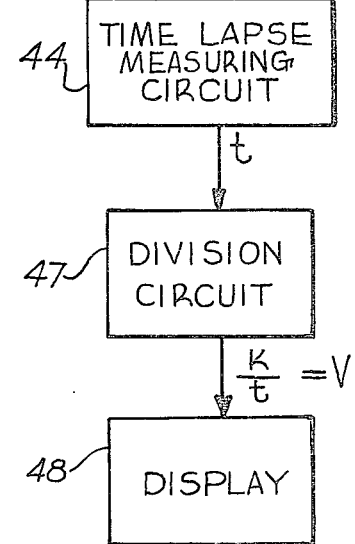

FIG. 6
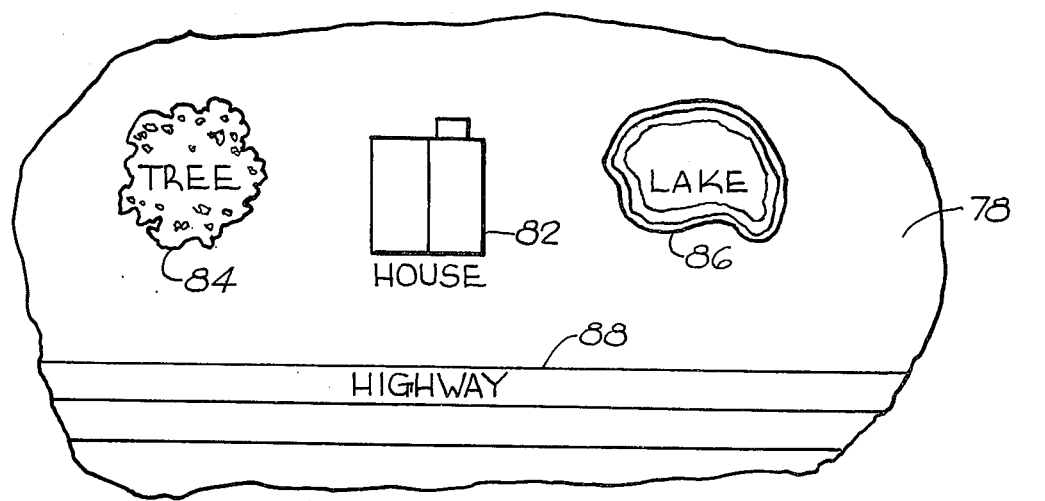
VISUAL SCENE
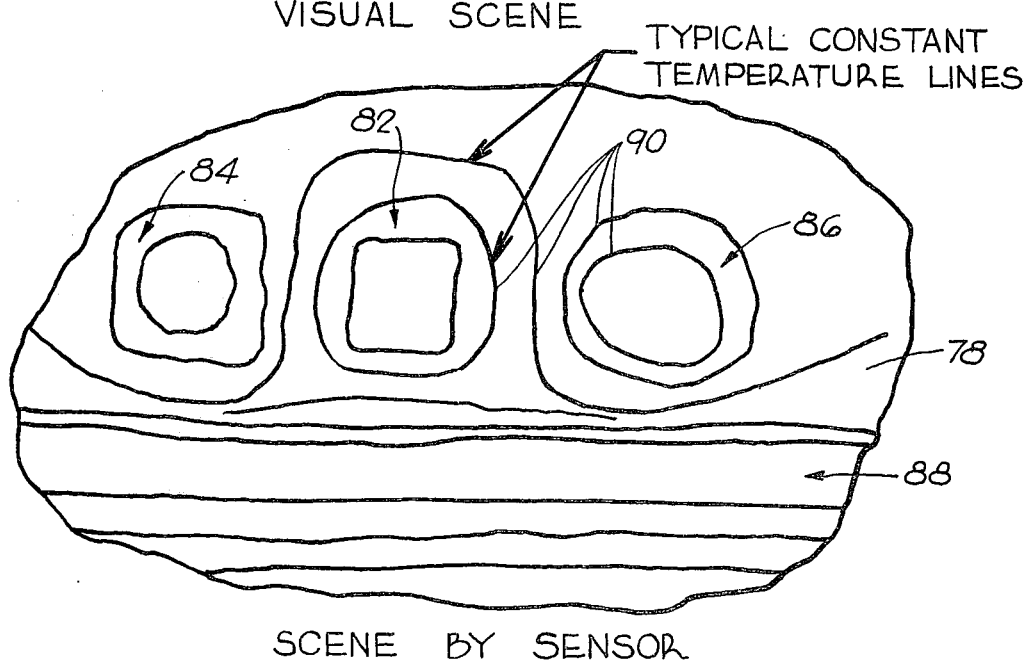
SCENE BY SENSOR
FIG. 7

TYPICAL RADIOMETER INTERCONNECTION CONFIGURATION

* DENOTES RIGID WAVEGUIDE

FIG.19

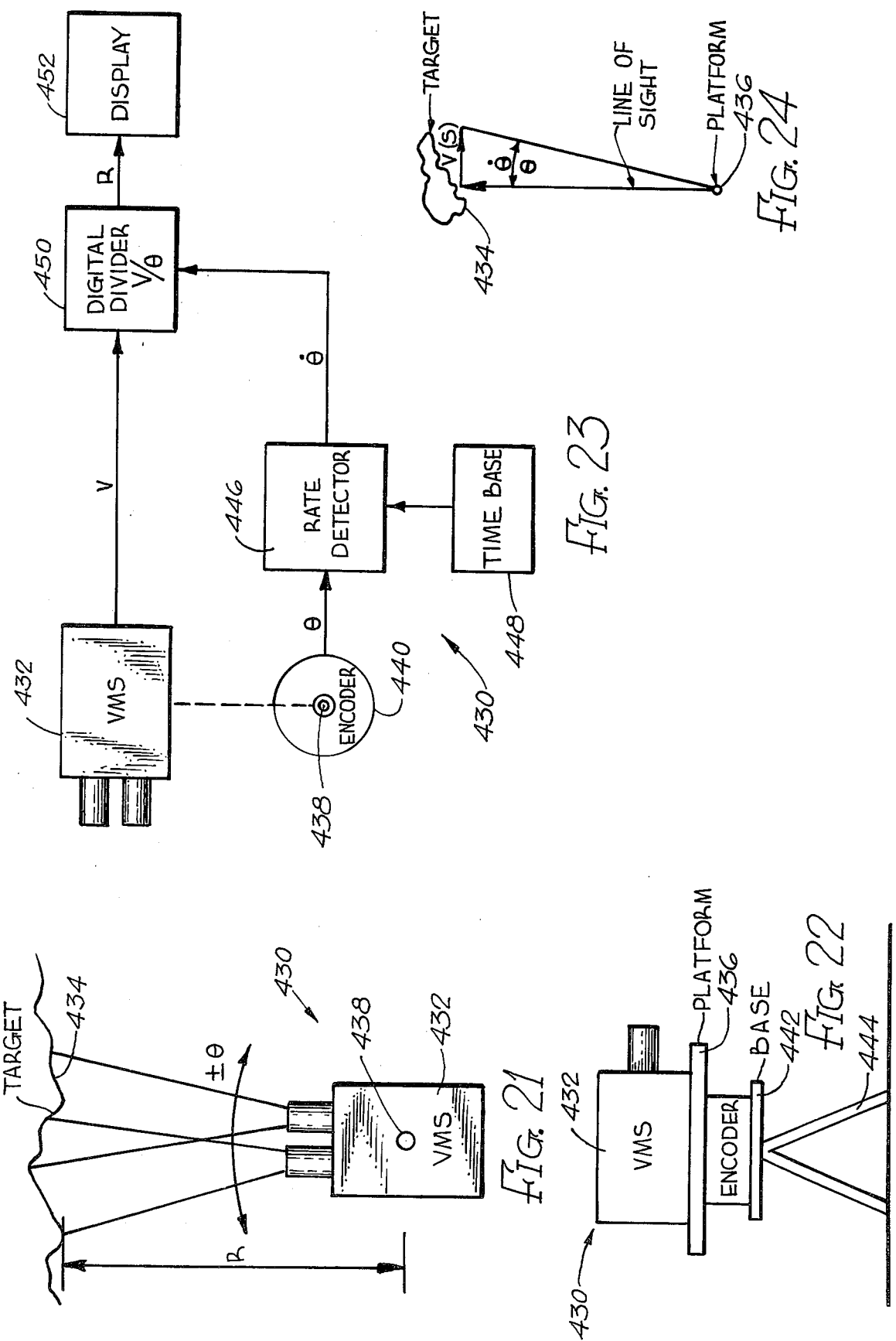

VELOCITY MEASURING SYSTEM

This invention relates to a velocity measuring system, including a method and apparatus for measuring the relative transverse velocity between a local station and a zone of reference or observation, separated from the local station.

One object of the present invention is to provide a new and improved velocity measuring system for making velocity measurements in unusual situations, in which such velocity measurements cannot readily be made by other methods. For example, the velocity measuring system of the present invention is well adapted for measuring the velocity of detached objects and moving fluids, such as liquids, gases and particulate materials having some degree of opacity. The system may also be employed very advantageously for measuring the velocity of helicopters and other aircraft. The velocity measuring system may be mounted on the aircraft, or on the ground.

A further object is to provide a new and improved velocity measuring system which does not involve the emission of any radiation, but rather responds passively to radiation emitted or reflected by objects or materials in the zone of observation.

Another object is to provide a new and improved system which makes velocity measurements automatically, accurately and rapidly.

A further object is to provide a velocity measuring system which is adaptable for measuring the range or distance to objects in the zone of observation, or the dimensions of such objects.

To accomplish these objects, the present invention provides a method of measuring velocity, preferably comprising the steps of receiving radiation along first and second parallel paths which are spaced apart by a predetermined transverse distance, converting the received radiation along such first and second paths into first and second electrical signals, and measuring the elapsed time between corresponding signal features of such first and second signals. Such signal features may be caused by radiation features due to relative transverse velocity between the local station and objects or materials in the zone of reference.

The radiation may be in the form of light, visible, infrared or ultraviolet, or radio waves, usually at ultra-high frequencies. The local station, constituting the point of measurement, may be either stationary or movable. If stationary, the method may be employed for measuring the transverse velocity of objects or materials in the zone of observation. If the local station is movable, the method may be employed to measure the velocity of the local station relative to the zone of reference or observation. For example, the local station may be mounted on a helicopter or other vehicle so that the method may be employed to measure the velocity of the helicopter relative to the terrain over which it is flying.

The present invention also provides apparatus for measuring transverse velocity, preferably comprising first and second directional devices or sensors for receiving radiation along first and second parallel paths which are spaced apart by a predetermined transverse distance. Each of the directional devices preferably includes electrical signal producing means for converting the received radiation into corresponding electrical signals. Any relative transverse velocity between the local station and objects in the zone of observation produces staggered radiation features along the first and second radiation paths, such features being staggered with respect to time. Correspondingly staggered signal features are developed by the first and second signal producing means. The apparatus preferably includes time lapse measuring means for determining the time lapse between the electrical signal features. The velocity represented by such time lapse is inversely proportional to the time lapse.

The apparatus of the present invention preferably includes division means for dividing the time lapse into a constant which represents the predetermined distance between the radiation path and a scale factor which determines whether the quotient is presented in terms of inches per second, feet per second, miles per hour, centimeters per second, kilometers per hour, or some other units.

The velocity measuring apparatus may utilize light as the received radiation. In that case, the directional devices may comprise optical means for focusing the light, and photoelectric means for converting the focused light into electrical signals. The focusing means may comprise lens systems having optical axes which form the parallel radiation paths.

Alternatively, the velocity measuring apparatus may utilize radio waves as the received radiation. In that case, the directional devices or sensors comprise directional radio antennas aimed along the parallel radiation paths. Radio receivers are connected to the antennas to convert the received radio radiation into electrical signals.

The use of radio waves as the received radiation is particularly advantageous for measuring the velocity of a helicopter or some other aircraft relative to the terrain over which it is flying. It has been found that objects and materials of all kinds on the surface of the earth emit measurable quantities of radio waves at ultra-high frequencies, due simply to the temperature of such objects and materials. Such radio waves will produce measurable signals when received by sensitive radio receivers. The strength of such signals varies in accordance with variations in the effective emission temperature of the objects and materials on the earth's surface. Due to such temperature variations, terrain features such as houses, roads, trees, bodies of water and the like, will produce radio radiation patterns or features which will result in corresponding signal features at the outputs of the radio receivers employed in the velocity measuring system. If there is relative velocity between the receiving station and the radio wave emitting terrain features, the corresponding signal features produced by the first and second radio receivers will be staggered or displaced with respect to time. The elapsed time between such staggered signal features is measured by the time lapse measuring means of the velocity measuring system.

The time lapse measuring means may comprise electronic circuits for rapidly and automatically measuring the time lapse with a high degree of accuracy. The measured time lapse is inversely proportional to the velocity which produces the time lapse. The velocity is preferably determined by electronically dividing the time lapse into a constant figure representing the distance between the two radiation paths and a scale factor. In the electronic division, the time lapse and the constant figure may be represented by trains of electrical pulses. The quotient is also represented by a train of pulses which may be employed to operate a display showing the velocity in terms of a decimal number. The electronic signal processing system may be essentially the same whether the received radiation is in the form of light or radio waves.

The velocity measuring system may be adapted for use in measuring the range or distance along the line of sight between the measuring station and the object in the zone of reference. This may be done by measuring the apparent velocity when the measuring station is swung through a known angular interval in a known length of time. The range can be calculated from the measured velocity, the known angular displacement and the known time interval.

The velocity measuring system can also be adapted for use in measuring the dimensions of a distant object by measuring the observed velocity and integrating it with respect to time when the measuring station is displaced so that it will scan the distant object.

Further objects, advantages and features of the present invention will appear from the following description, taken with the accompanying drawings, in which:

FIG. 1 is a diagrammatic view showing a velocity measuring system or apparatus to be described as a first illustrative embodiment of the present invention, such embodiment utilizing light as the received radiation.

FIG. 2 is a diagrammatic view, taken at right angles to FIG. 1, and showing the overlapping fields of view of the first and second optical systems employed in FIG. 1.

FIG. 3 is a perspective view showing the optical systems of FIG. 1.

FIG. 4 is a diagrammatic sectional view taken longitudinally through the optical systems of FIG. 1.

FIG. 6 is a diagrammatic plan view of typical terrain as seen visually from the helicopter.

FIG. 7 is a corresponding diagrammatic view showing the scene of FIG. 6 in terms of effective temperature variations which produce corresponding variations in the emitted radio waves.

FIGS. 14–19 are electronic circuit diagrams representing portions of an electronic system corresponding generally to that of FIG. 13. Specifically:

Figure 14:
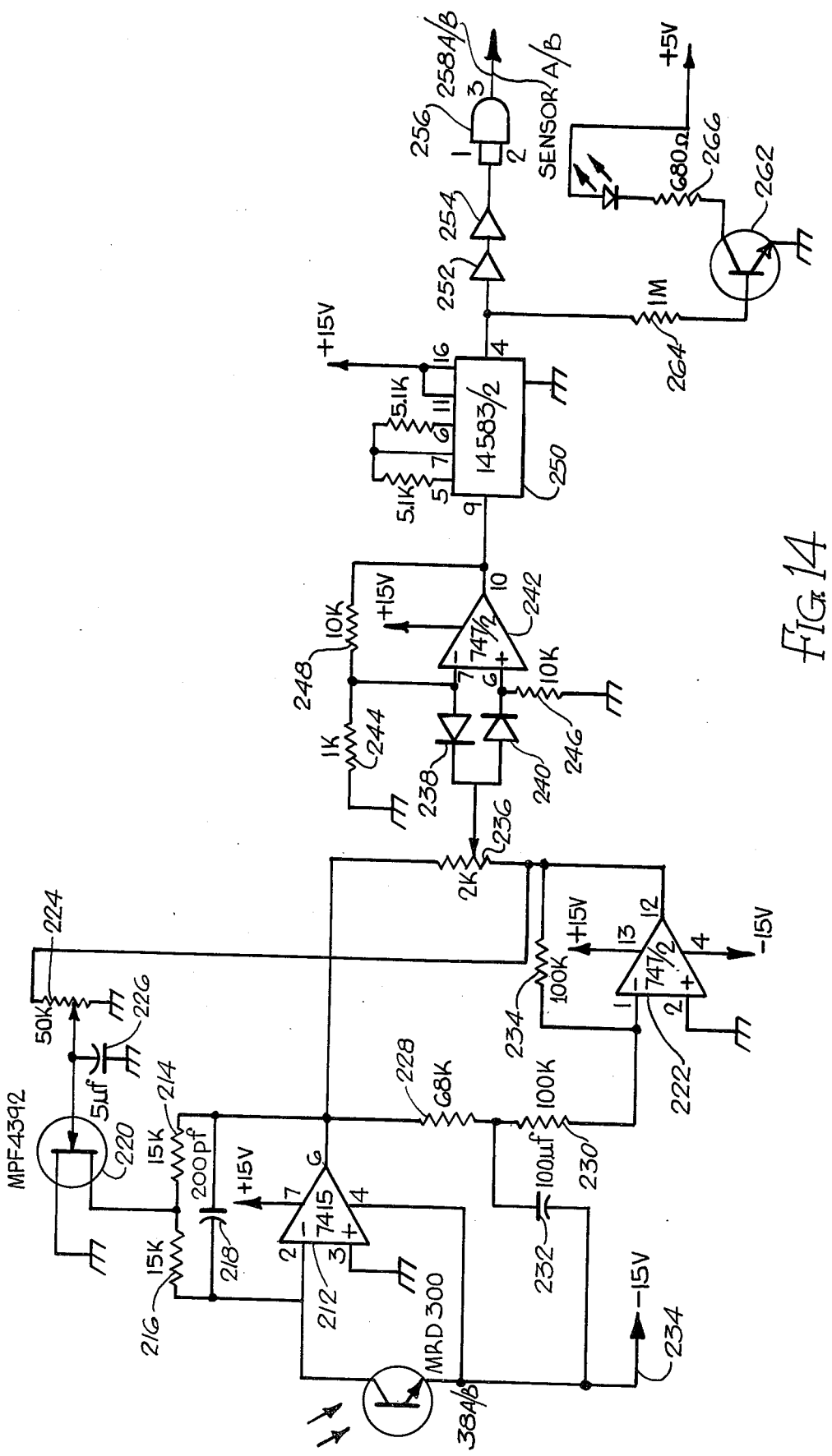

FIG. 14 relates to an electronic preamplifier and signal digitizer or processor.

Figure 15:
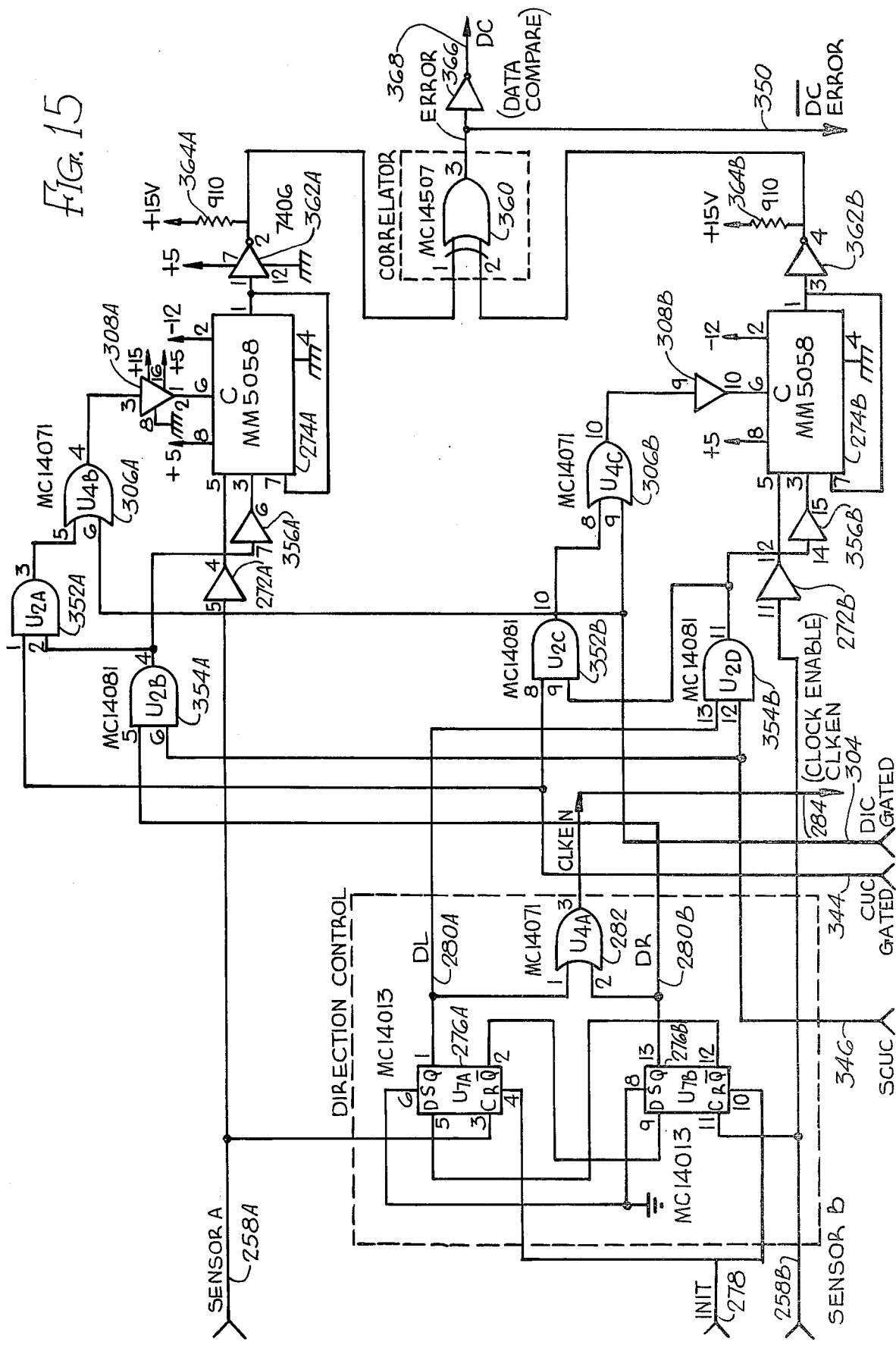

FIG. 15 relates to shift registers for storing the digitized signals from channels A and B, a signal correlator and a directional control circuit.

Figure 16:
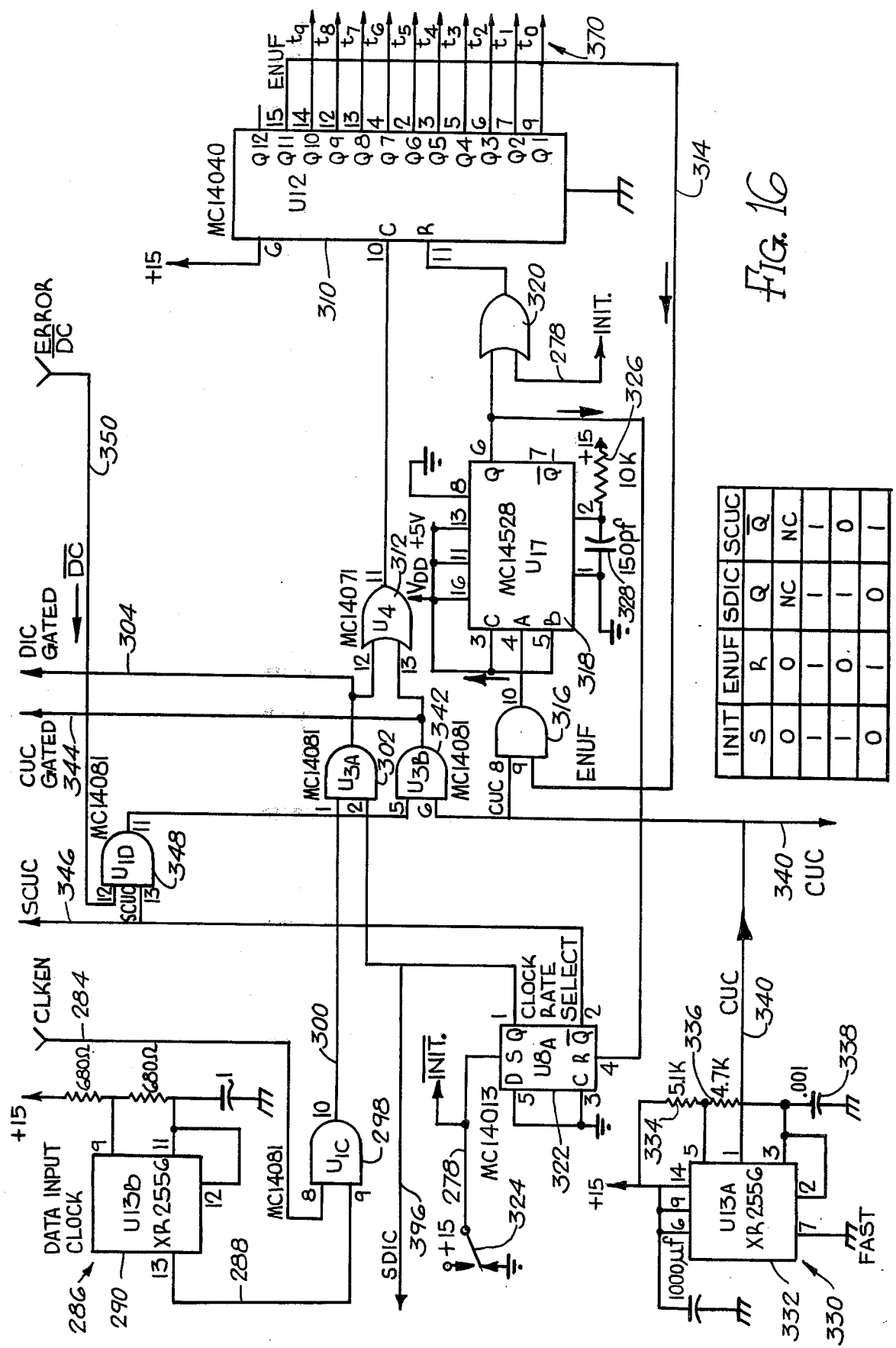

FIG. 16 relates to a data input clock for providing real time pulses, a catch-up clock for providing fast pulses, a clock control, and a counter for counting the clock pulses.

Figure 17:
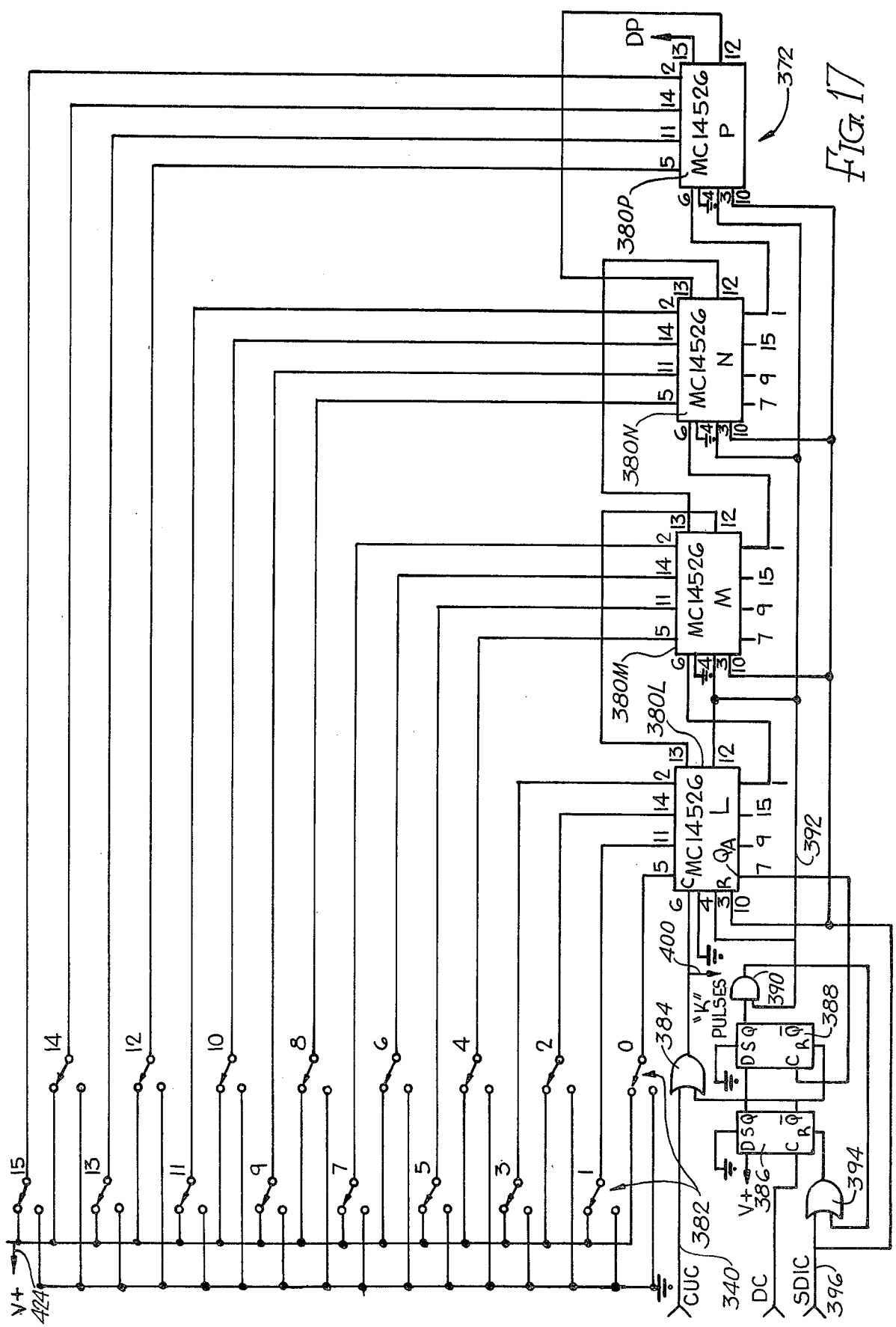

FIG. 17 relates to a constant or "K" generator for producing a pulse train representing the constant figure into which the elapsed time is to be divided.

Figure 18:
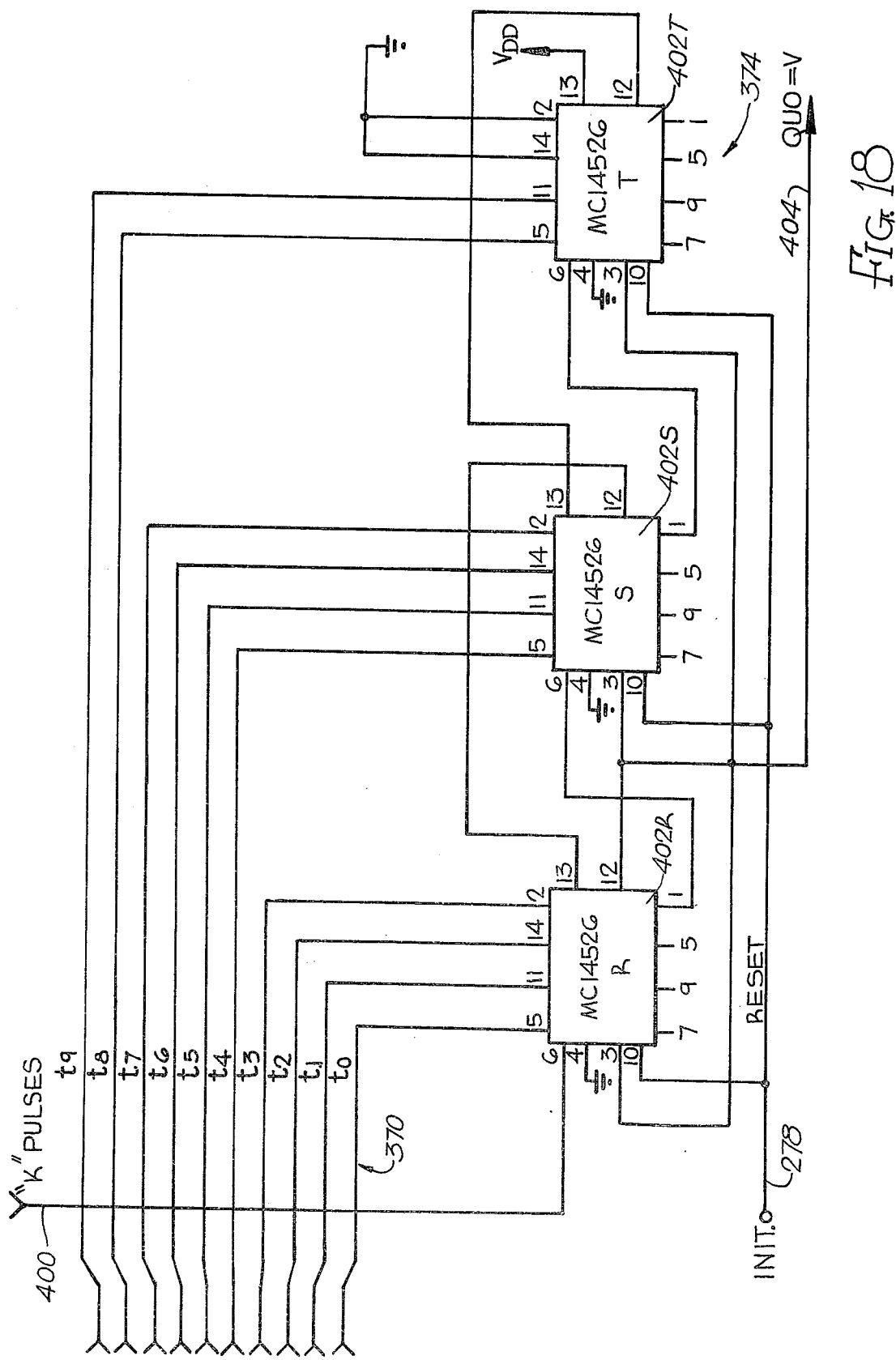

FIG. 18 represents the divider circuit for performing such division.

Figure 19:
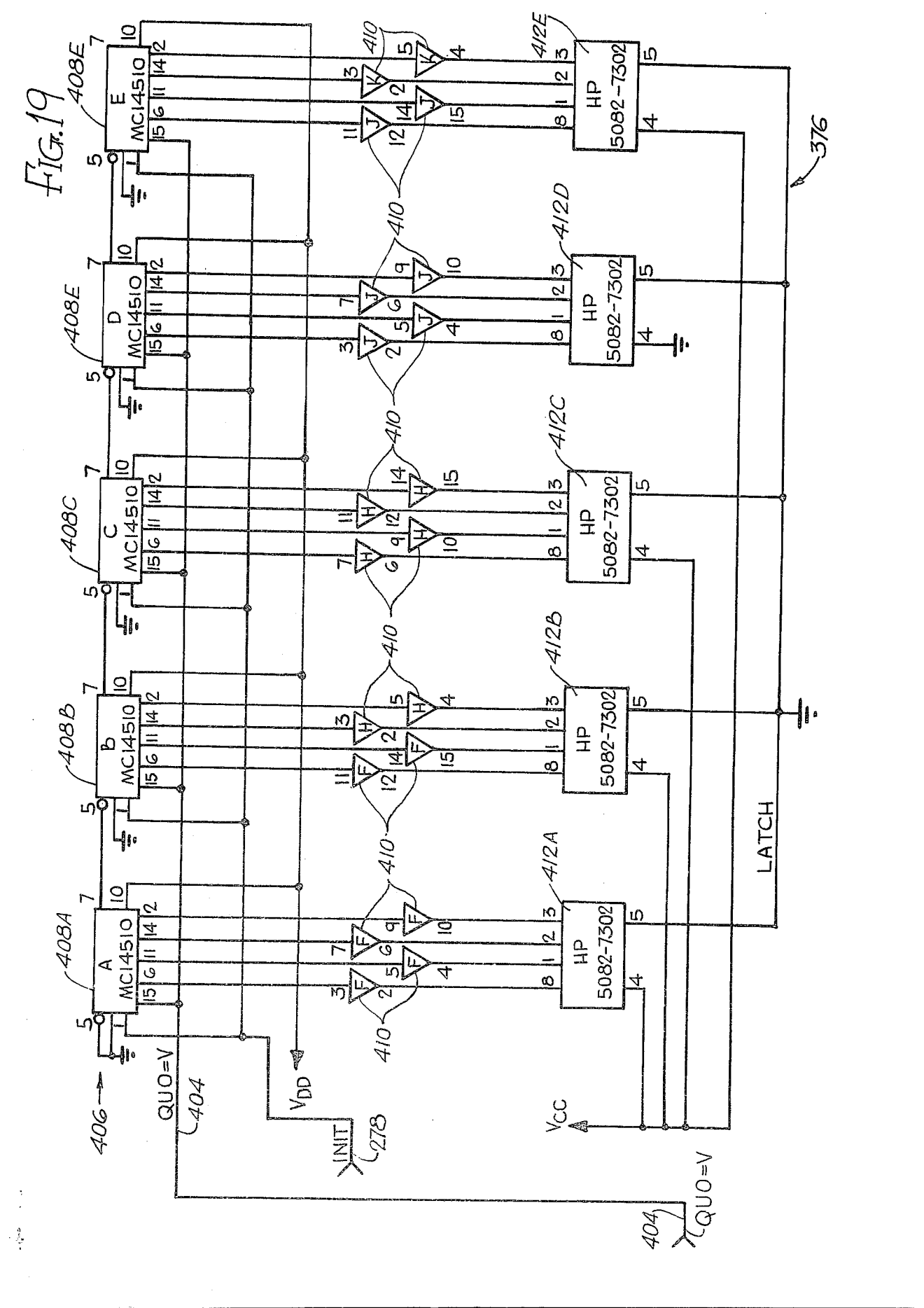

FIG. 19 represents a display for displaying the quotient of such division.

Figure 20:
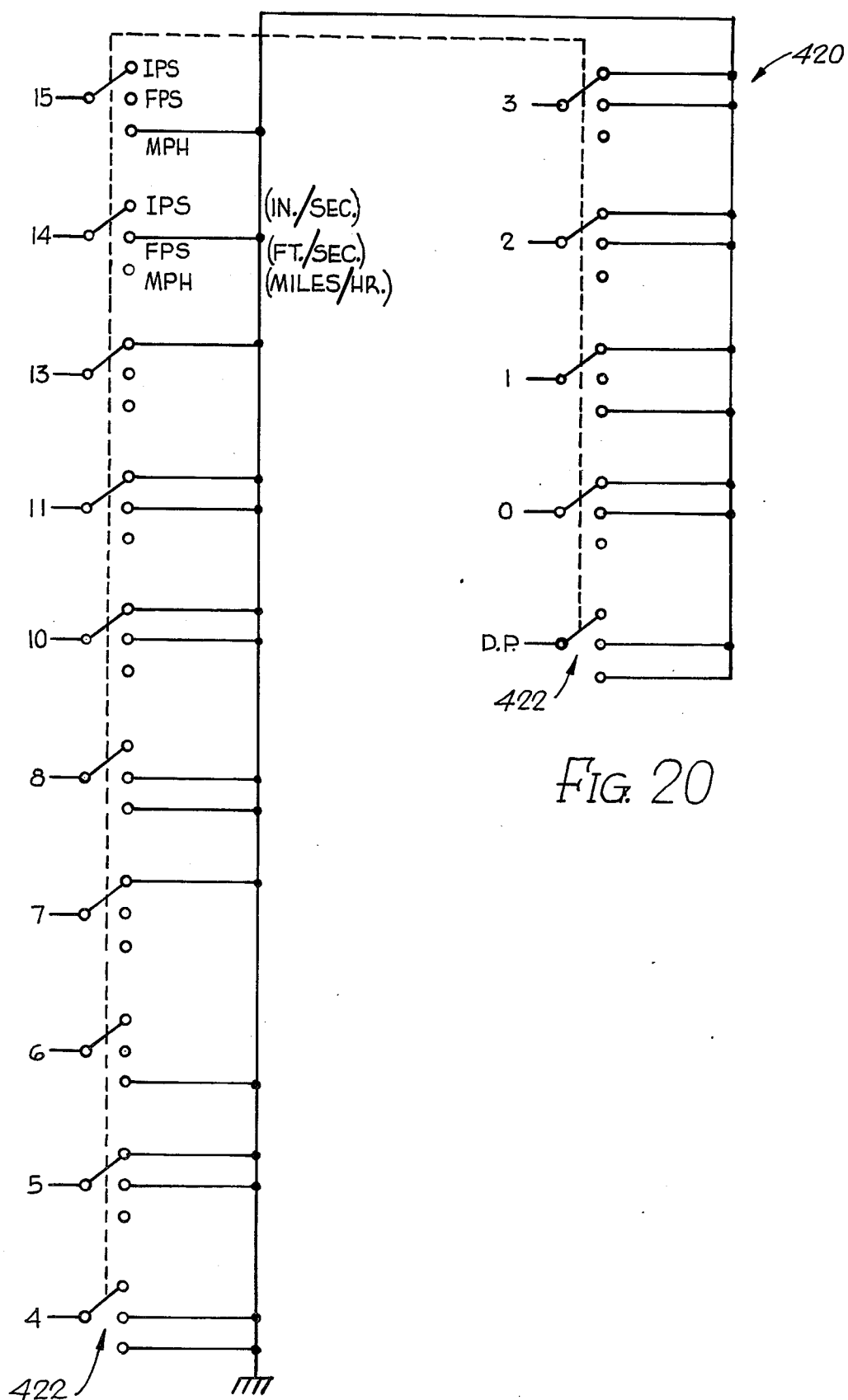

FIG. 20 is a circuit diagram of a switching circuit for optional use in connection with the K-generator of FIG. 17.

FIG. 21 is a diagrammatic plan view showing an adapatation of the velocity measuring system for use in measuring the range of distance to an object in the field of view.

FIG. 22 is a diagrammatic elevational view of the embodiment of FIG. 21.

FIG. 23 is a block diagram relating to the range measuring system of FIG. 21.

FIG. 24 is a diagram illustrating the calculation of the range.

FIG. 25 is a block diagram illustrating an adaptation of the velocity measuring system for measuring the dimensions of a distant object.

FIG. 26 is a diagrammatic plan view of the embodiment of FIG. 25.

FIG. 27 is a diagrammatic elevational view showing the manner in which the line of sight of the measuring device of FIG. 25 and 26 may be scanned across the object to be measured.

As just indicated, FIGS. 1–4 illustrate a velocity measuring system 30 in which radiation in the form of light is received by first and second directional detection devices or sensors 32A and B, aimed along first and second parallel directional axes 34A and B which are spaced apart by a transverse distance d. The sensors 32A and B include optical focusing means, illustrated as lens systems 36A and B, for focusing the received radiation, and photoelectric cells or devices 38A and B for converting the focused radiation into corresponding electrical signals. The lens systems 36A and B have fields of view 40A and B which preferably overlap, as clearly shown in FIG. 2.

The lens systems 36A and B are focused upon a zone of reference or observation 42 which may contain various visible objects or materials. These objects and the like produce variations or features in the radiation received by the sensors 32A and B.

If there is relative transverse velocity between the local measuring station, as represented by the velocity measuring system 30, and the zone of reference 42, the objects or radiation features will move across the fields of view 40A and B. The movement of the objects or radiation features will produce corresponding variations or features in the electrical signals from the photocells 38A and B. Due to the transverse displacement or distance d between the sensors 32A and B, the signal features from the two photocells 38A and B are staggered or shifted with respect to time. The time lapse between the corresponding signal features is inversely proportional to the velocity of the relative movement. The velocity may be due to the movement of the objects being viewed or to movement of the local measuring station.

The electrical signals from the sensors 32A and B are supplied to a time lapse measuring circuit 44, preferably through digitizer circuits 46A and B. The time lapse measuring circuit 44 is effective to measure the time lapse between the corresponding signal features from the photocells 38A and B.

The measured time lapse is preferably divided into a constant figure K by a division circuit 47. The constant K represents the transverse distance d between the sensors 32A and B and a scale factor which determines the units in which the quotient will be expressed, such as inches per second, feet per second, miles per hour, centimeters per second, or the like. The quotient representing the velocity V is supplied to a display or readout device 48.

To facilitate electronic computation, the time lapse t, the constant K and the velocity V may all be expressed in terms of binary words, but the display 48 may be effective to present the velocity as a decimal number.

With electronic computation circuits, it is possible to measure the time lapse t and to compute the velocity V with a high degree of accuracy. Moreover, these operations are carried out very rapidly.

Additional details of the velocity measuring system 30 are shown in FIGS. 3 and 4. The lens systems 36A and B may be mounted on a housing 50 which provides light-tight compartments 52A and B in which the photocells 38A and B are mounted. Thus, the photocells 38A and B are illuminated solely by the light passing through the lens systems 36A and B. As shown, the lens systems 36A and B are of the telescopic type for producing large images of distant objects. However, the focal length or magnification of the lens systems 36A and B may be varied, as needed, to suit the particular zone which is being monitored by the velocity measuring system. Thus, lens systems may be provided for viewing zones of reference which are miles, feet or inches away. Moreover, the lens systems may be of the microscopic type if desired.

For convenience, some of the signal processing components may be mounted within the housing 50. As shown in FIG. 4, the housing 50 has a separate compartment 54 which contains preamplifiers 56A and B and digitizer components 58A and B, cascaded between the respective photocells 38A and B and output lines 60A and B.

Figure 5:
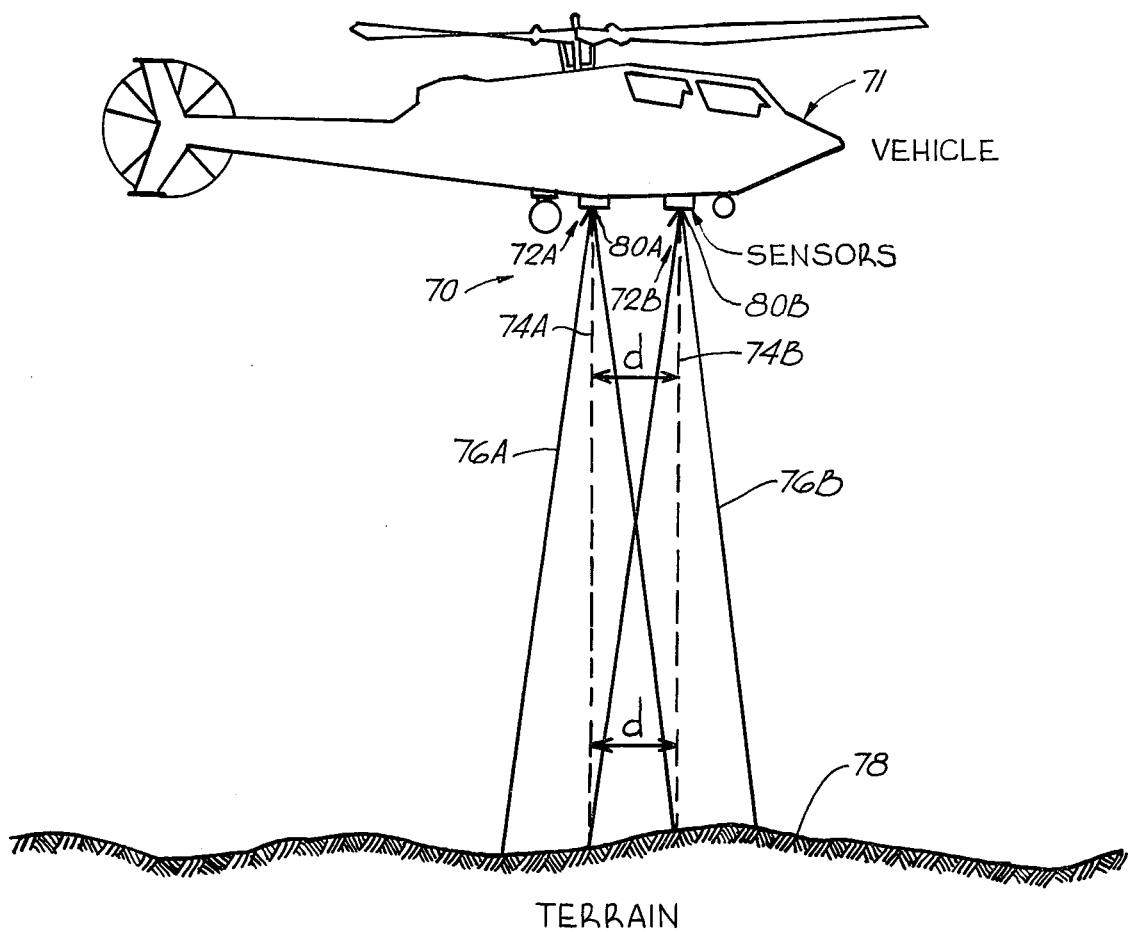
FIG. 5 is a diagrammatic elevation of a second illustrative embodiment of the invention, mounted on a vehicle, such as a helicopter, for measuring the velocity of the vehicle relative to the terrain over which the vehicle is traveling, such embodiment preferably utilizing radio waves as the received radiation.

FIG. 5 illustrates a modified velocity measuring system 70, constituting another embodiment of the present invention. In this case, the velocity measuring system 70 is mounted on a vehicle, illustrated as a helicopter 71. The velocity measuring system 70 comprises first and second sensors 72A and B which are aimed along parallel directional axes 74A and B, representing the paths along which radiation is received by the sensors 72A and B. As before, the sensors 72A and B have overlapping fields of view 76A and B. The directional axes 74A and B are spaced apart by a transverse distance d.

In this case, the sensors 72A and B are aimed downwardly at the terrain 78 over which the helicopter 71 is flying. The terrain 78 constitutes the zone of reference or observation. It will be understood that the velocity measuring system 70 may be employed on any type of aircraft. The velocity measuring system 70 is effective to measure the velocity of the vehicle 71 relative to the terrain 78.

If desired, the sensors 72A and B may be adapted to receive radiation in the form of light, as in the case of the previously described velocity measuring system. However, it is preferred to construct the sensors 72A and B for the reception of radiation in the form of radio waves, usually at ultra-high frequencies. The use of ultra-high frequencies makes it possible to provide sensors 72A and B which are highly directional. Thus, the illustrated sensors 72A and B employ highly directional ultra-high frequency antennas 80A and B, such as waveguide horns.

It has been found that objects and materials on the surface of the earth emit measurable levels of ultra-high frequency radio waves, due simply to the temperature of such objects and materials. The strength of such radio waves varies in accordance with variations in the effective emitting temperature of such objects and materials. Consequently, objects and features of the terrain 78 produce radiation features or variations at the sensors 72A and B. Such radiation features are translated into corresponding electrical signal features by the sensors 72A and B. The signal features produced by the first and second sensors 72A and B are staggered or shifted with respect to time, due to the distance d between the radiation paths 72A and B. As before, the velocity of the vehicle 71 is determined by measuring the time lapse between the corresponding signal features produced by the sensors 72A and B, and then by dividing the time lapse into a constant K representing the distance d and a scale factor, to determine the units in which the velocity is presented.

FIGS. 6 and 7 illustrate typical terrain, such as the terrain 78, as seen by visible light and by ultra-light frequency radio radiation. The terrain 78 may include various objects and features, such as a house 82, a tree 84, a lake 86, or any other body of water, and a highway 88. FIG. 7 illustrates the same terrain features in terms of temperature variations, which produce corresponding variations in the emitted radio radiation. To illustrate the temperature variations, FIG. 7 includes typical constant temperature lines or contours 90. It will be seen that these constant temperature contours correspond roughly to the outlines of the terrain features 82–88. Thus, the radio radiation features correspond generally to the visual features of the terrain.

Figure 8:
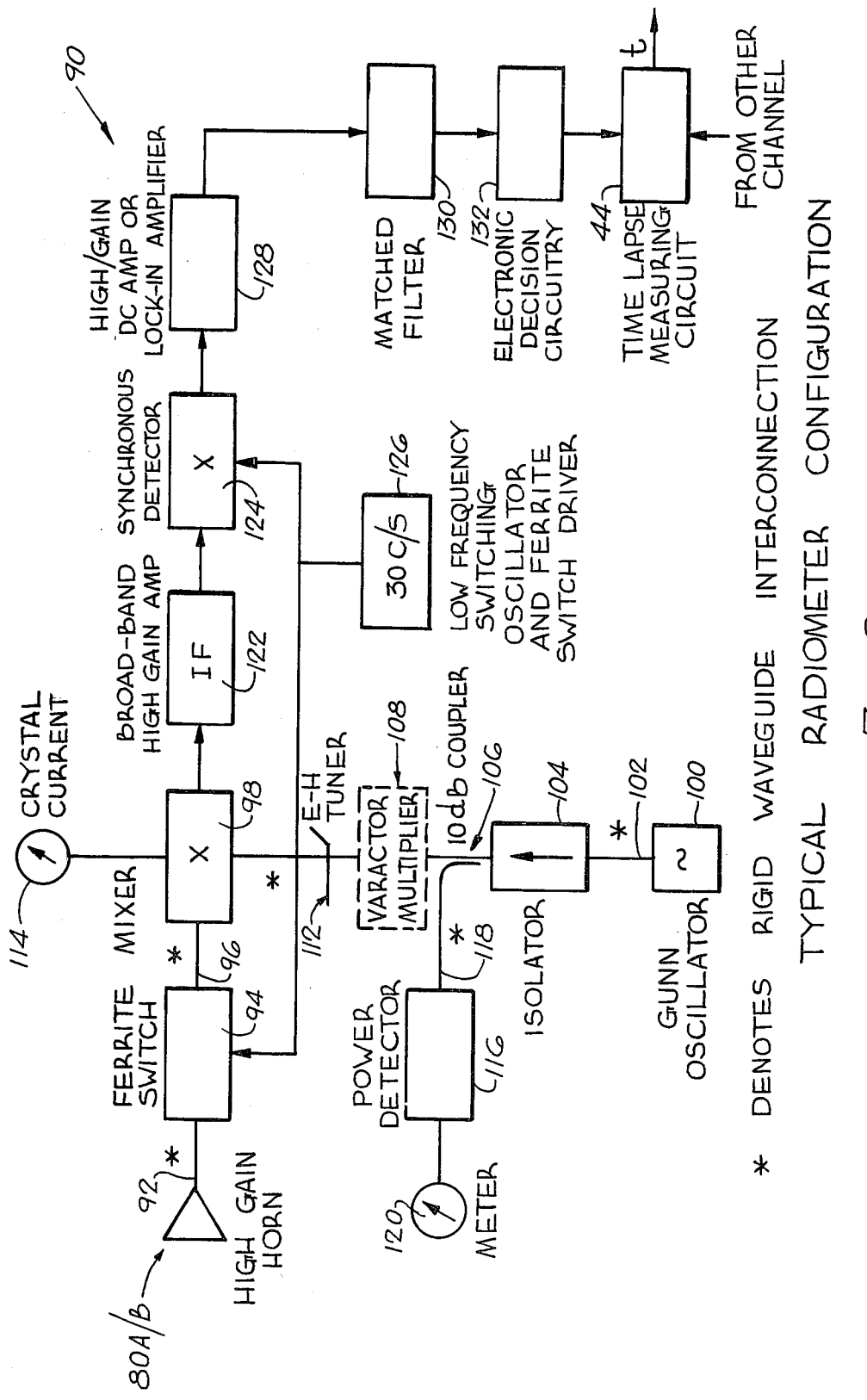
FIG. 8 is a block diagram representing one of the two typical radio receivers employed in the embodiment of FIG. 5.

The sensors 72A and B may include radio receivers or radiometers 90, which may be of the construction illustrated in FIG. 8. Only one radio receiver 90 is illustrated, but it will be understood that a separate radio receiver is provided for each of the sensors 72A and B.

As previously indicated, the radio waves are received by a high gain directional waveguide horn 80A or B, which may be connected through a waveguide 92, a ferrite switch 94, and another waveguide 96 to a mixer 98, which may be of the crystal type. Local oscillator signals are provided by a Gunn oscillator 100 which may be coupled through a waveguide 102, an isolator 104, a coupler 106, a varactor multiplier 108, and another waveguide 110 to the mixer 98. The waveguide 110 may be provided with a tuner 112. A meter 114 may be connected to the mixer 98 to measure the current. To assist in tuning and adjusting the local oscillator circuit, a power detector 116 may be connected to the coupler 106 by a waveguide 118. A meter 120 is connected to the power detector.

The intermediate frequency signals from the mixer 98 are amplified by a broad-band high gain IF amplifier 122, which feeds its output to a synchronous detector 124. The ferrite switch 94 and the synchronous detector 124 are driven by a low frequency switching oscillator 126, which may produce switching signals at 30 cycles per second, for example.

The signal output from the synchronous detector 124 is fed through a high gain DC amplifier or lock-in amplifier 128 and a matched filter 130 to an electronic decision circuit 132, which may correspond generally with the digitizer 46 of FIG. 1. The output of the circuit 132 may go to the time-lapse measuring circuit 44, which has already been described in connection with the velocity measuring system 30 of FIG. 1. The remainder of the velocity measuring system 70 of FIG. 8 may be substantially the same as described in connection with FIG. 1. Thus, the time lapse or shift t measured by the circuit 44 may be supplied to the division circuit 47, which divides the time lapse t into the constant K to compute the velocity V. The quotient V is supplied to the display 48, which may present the velocity V as a decimal number.

Figure 9:
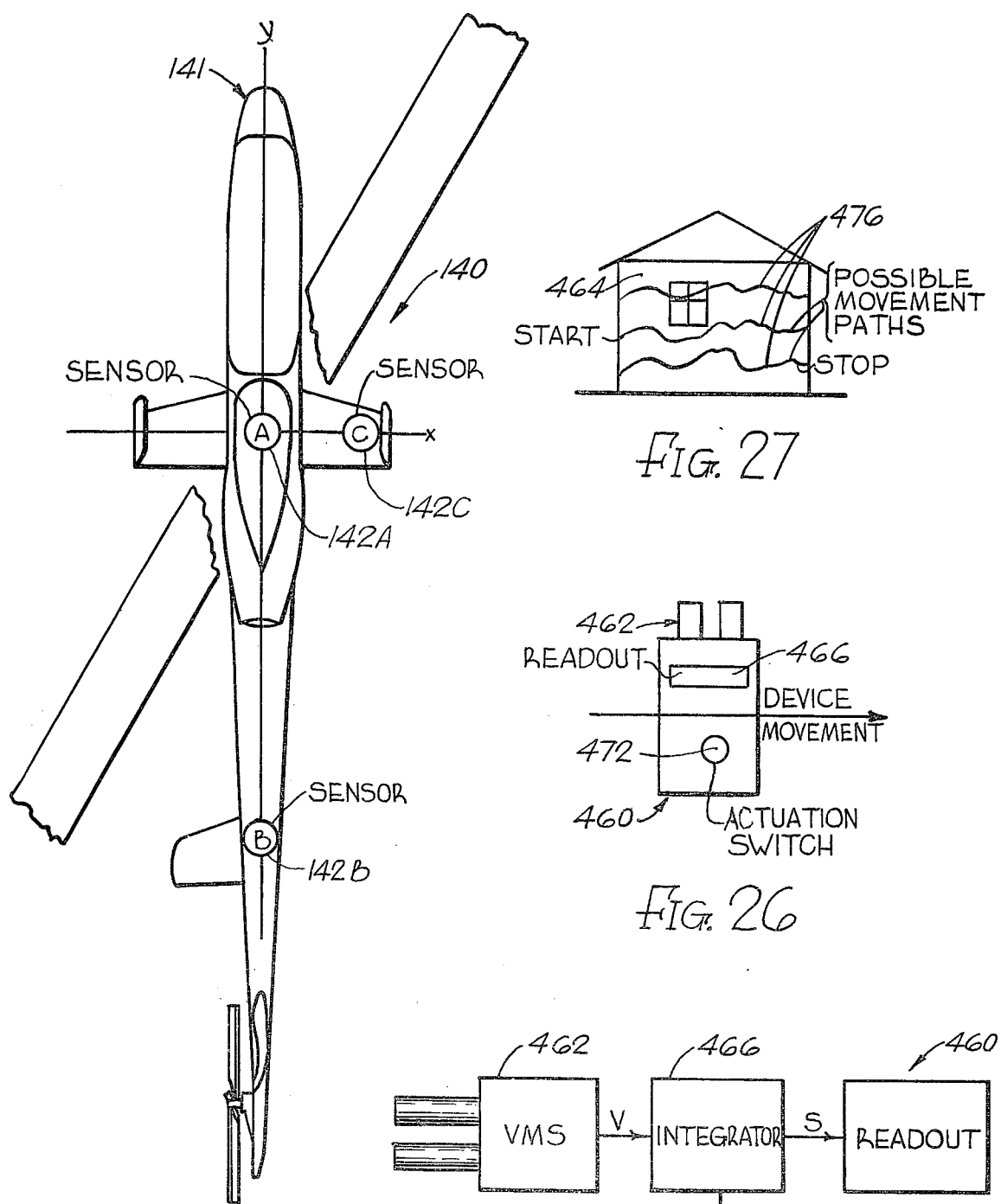
FIG. 9 is a plan view of the helicopter, showing typical locations of three radio sensors for a dual velocity measuring system in which the velocity is measured along both X and Y rectangular coordinates.
Figure 10:
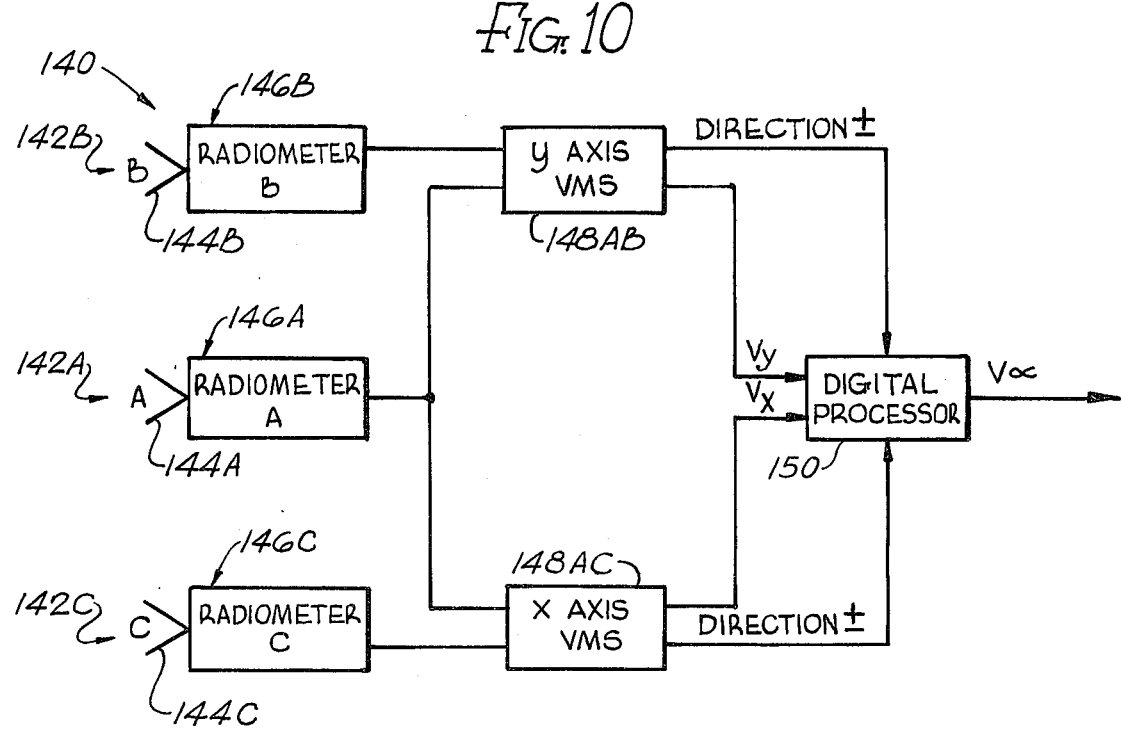
FIG. 10 is a block diagram representing the dual velocity measuring system of FIG. 9.
Figure 11:
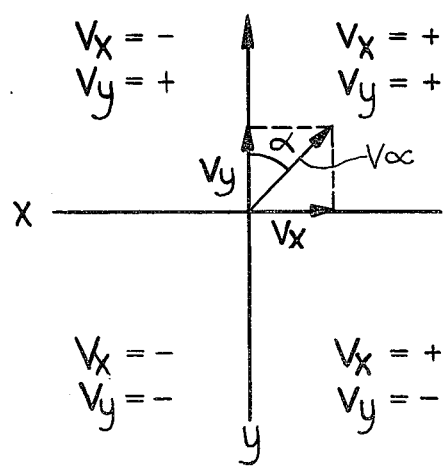
FIG. 11 is a diagram representing the vector summation of the velocity measurements along the X and Y coordinates.

FIGS. 9, 10 and 11 illustrate a modified velocity measuring system 140, capable of measuring velocity along two orthogonally related axes, designated the x and y axes. From these two velocity measurements, the true vector velocity can be computed. Moreover, the vector angle α of the true velocity can be determined. As before, the velocity measuring system 140 is illustrated as being mounted on a helicopter 141, but it will be understood that the velocity measuring system may be employed on a vehicle of any type, or on any suitable measuring station, fixed or movable.

The velocity measuring system 140 includes all of the components as previously described in connection with the velocity measuring system 70 of FIGS. 51-8. However, instead of including only two sensors along a single axis, the velocity measuring system 140 includes three sensors 142A, B and C, disposed along the x and y axes. Thus, the sensors 142A and B are located along the y-axis, which is parallel with the longitudinal axis of the vehicle 141. The sensors 142A and C are located along the x-axis, which extends laterally, perpendicular to the y-axis. The three sensors may be otherwise located on the vehicle, but this arrangement of the sensors 142A, B and C, along orthogonally related axes, simplifies the computations to be carried out by the velocity measuring system.

As shown in FIG. 10, the sensors 142A, B and C preferably comprise directional antennas 144A, B and C which are connected to the inputs of radio receivers or radiometers 146A, B and C. Individually, the directional antennas 144A, B and C and the radio receivers 146A, B and C may be the same as the antennas 80A and B and the radio receivers 90A and B, previously described in connection with FIGS. 5-8.

The output signals from the radio receivers 146A and B are supplied to a y-axis velocity measuring circuit 148AB, which determines the velocity by measuring the time lapse or shift between the signals and then dividing the time lapse into a constant. Similarly, the output signals from the radio receivers 146A and C are supplied to an x-axis velocity measuring circuit 148AC which measures the velocity along the x-axis.

The x and y axes velocities from the measuring circuits 148AC and 148AB are supplied to a digital processor or computer 150 which computes the true vector velocity $V_\alpha$ and the vector angle α relative to the heading of the vehicle, as presented by the vector diagram of FIG. 11. The digital processor 150 preferably displays the true vector velocity $V_\alpha$, the angle α and the polarity or sign of the x and y velocities $V_x$ and $V_y$. These polarities are indicated in FIG. 11 for the four quadrants of the x and y axes.

The digital processor 150 can readily compute the true vector velocity Vα by calculating the square root of the sum of the squares, as shown by the following equation:

$$V\alpha = \sqrt{V_x^2 + V_y^2} \qquad (1)$$

The digital processor 150 can readily compute the angle by using its cosine or tangent, in accordance with either of the following equations:

$$\alpha = \text{arc } \cos(V_y/V_\alpha) \qquad (2)$$

$$\alpha = \tan(V_x/V_y) \qquad (3)$$

The sign of the x and y velocity components $V_x$ and $V_y$ can readily be derived from the direction control components of the velocity measuring circuits 148AC and 148AB.

Thus, the computation of the true vector velocity and the vector angle are quite simple for the sensor arrangement of FIG. 9. Various other sensor arrangements may be employed. For example, the three sensors may be located at the corners of an equilateral triangle, or an isosceles triangle. For such modifications, the digital processor 150 is modified to carry out the computations, which will employ more complicated trigonometry.

The velocity measuring system 140 of FIGS. 9—11 may operate synchronously. For instance, while the sensors 142A, B and B are being sampled for data, the processor 150 may compute and display the results from the previous data sample. The display is updated during each data cycle. The length of the data cycle may be varied, as desired. For example, a new data may be taken every second, in which case the display is updated each second. It will be understood that either higher or lower sampling rates may be employed. The desirable sampling rate depends somewhat upon the velocity of the air craft or other vehicle. If the velocity is very low, the sampling rate should be relatively slow in order to allow enough time to accumulate a meaningful quantity of data from the sensors. If the velocity is high, the sampling rate should be high.

Figure 12:
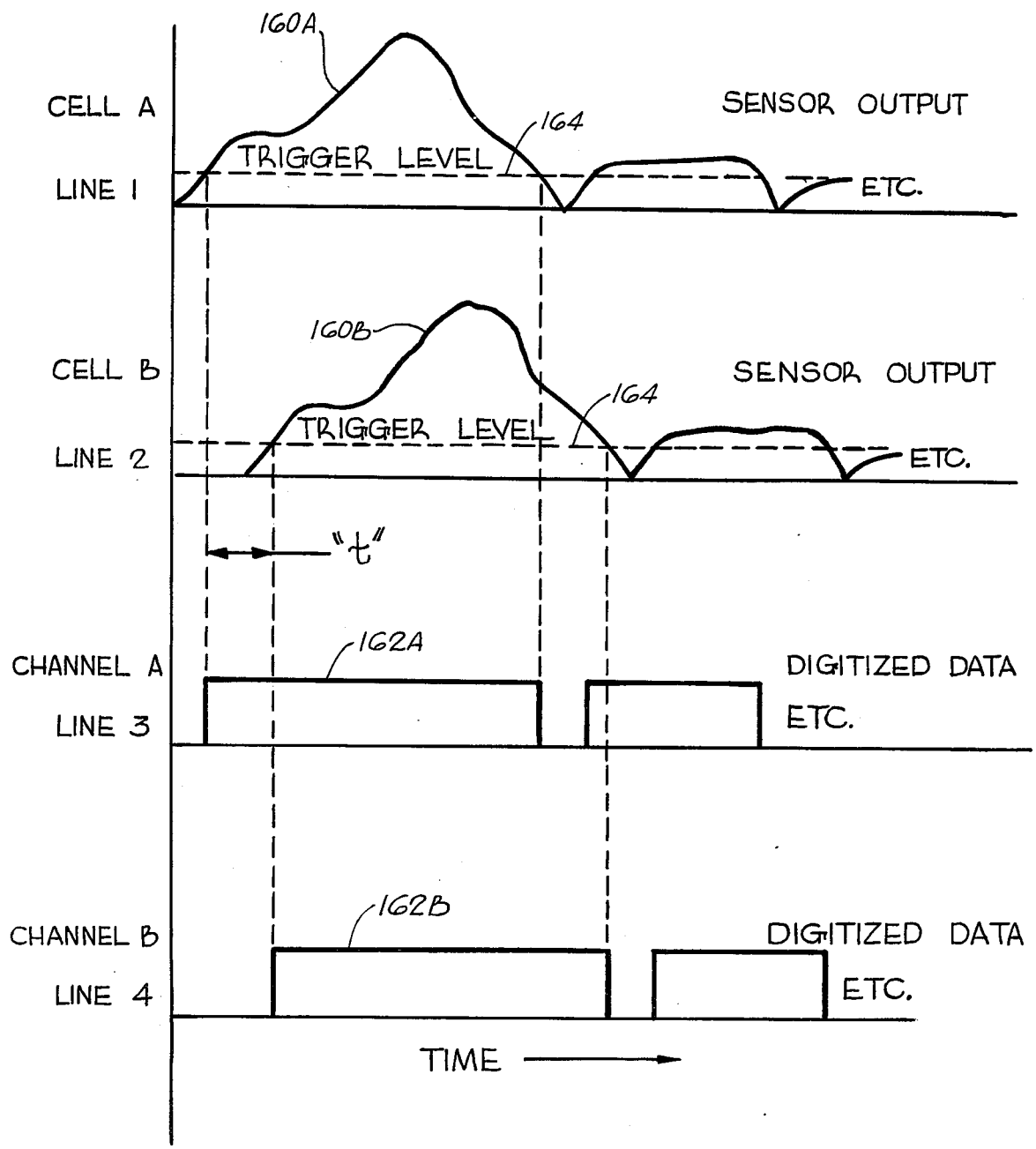
FIG. 12 is an electrical signal diagram representing typical received electrical signals which are staggered in the two channels with respect to time, and the manner in which such signals may be processed to digitize them.

FIG. 12 is a waveform diagram illustrating the signal processing or digitizing of the signals from the sensors of channels A and B. The diagrams of FIG. 12 are applicable to the velocity measuring system 30 of FIGS. 1-4, in which the sensors include photocells, and also to the velocity measuring system 70 of FIGS. 5-8, in which the sensors include radio receivers. For clarity, FIG. 12 will be described with reference to the velocity measuring system of FIGS. 1-4, utilizing the photocells 38A and B to convert the received light into corresponding electrical signals.

Lines 1 and 2 of FIG. 12 show typical sensor output signals 160A and B, which may be derived from the photocells 38A and B. These signals are of irregular waveform, depending upon the shape of the objects being scanned. The sensor output signals 160A and B are of the same or very similar waveform, but are staggered or shifted with respect to time, due to the transverse distance d between the sensors. The time shift or lapse is indicated as t.

For the purposes of computation, it is preferred to digitize the signals 160A and B, so as to produce the digitized square wave signals 162A and B, shown along lines 3 and 4 in FIG. 12. It will be seen that the digitized signals 162A and B are zero when the sensor output signals 160A and B are below a predetermined trigger level 164. The digitized signals 162A and B go to 1 when the sensor output signals 160A and B rise above the trigger level 164. The same time shift or lag t exists between the digitized signals 162 A and B, as in the case of the sensor output signals 160A and B. However, this time shift exists between the sharply rising leading edges of the digitized signals 162A and B, so that the digitizing of the signals makes it possible to measure the time shift t more easily and accurately.

Figure 13:
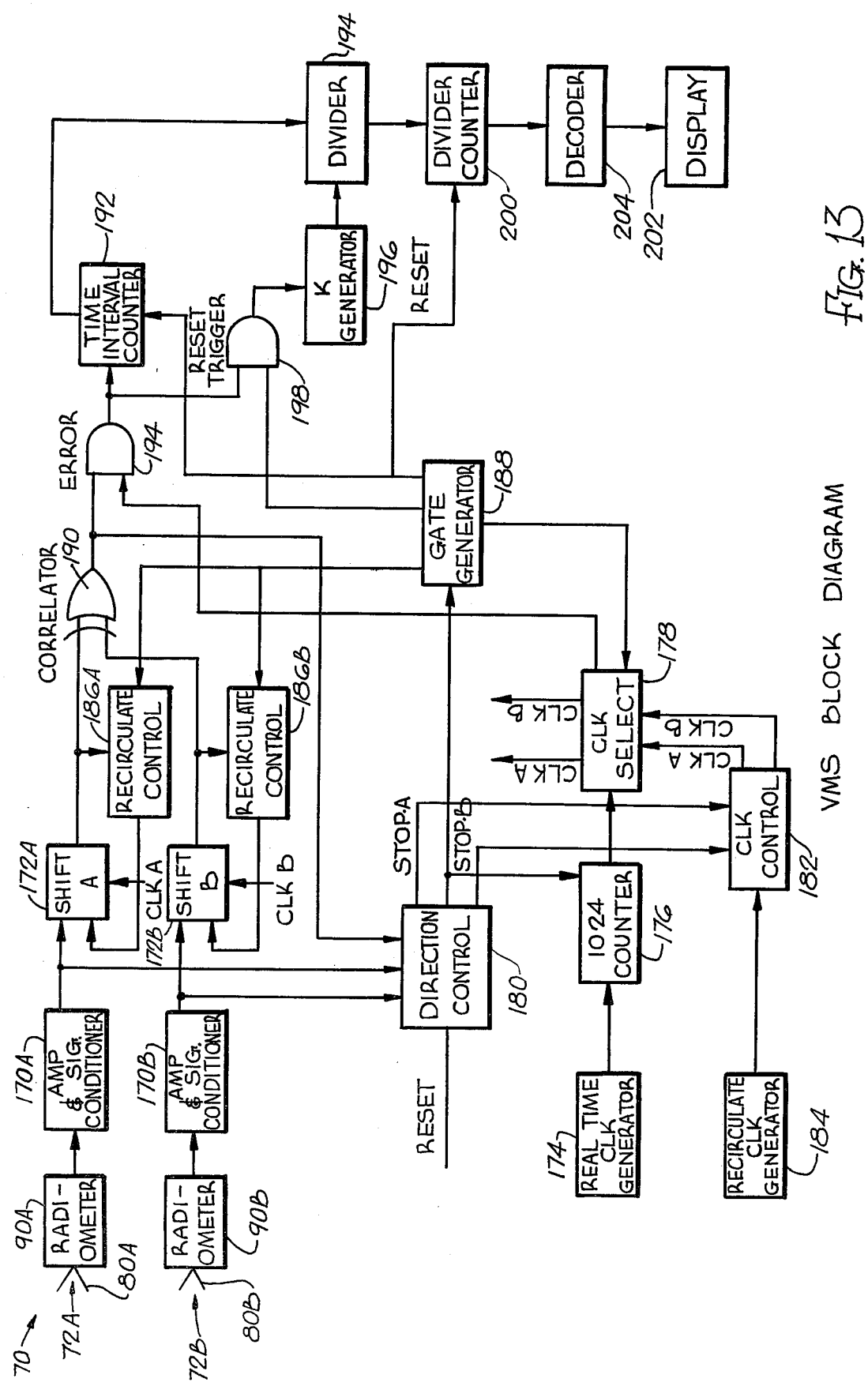
FIG. 13 is a block diagram of an electronic system for computing the velocity represented by the staggered electrical signals.

FIG. 13 is an electronic block diagram of the velocity measuring system 70 of FIGS. 5-8. However, it should be understood that the block diagram of FIG. 13 is also applicable to the velocity measuring system 30 of FIGS. 1-4. Thus, essentially the same electronic signal processing and computing circuits may be employed, whether the sensors A and B are responsive to light, as in FIGS. 1-4, or to radio waves, as in FIGS. 5-8.

FIG. 13 illustrates the sensors 72A and B of FIGS. 5-8, such sensors being responsive to radio waves. As previously described, the sensors A and B may include the high gain directional radio antennas 80 A and B and the sensitive radio receivers or radiometers 90A and B.

The sensor output signals from the radio receivers 90A and B are supplied to amplifiers and signal conditioners 170A and B which square off or digitize the signals in the manner described in connection with FIG. 12.

The digitized signals are sampled and stored in shift registers 172A and B, the storage capacity of which may be 1024 bits, or any other suitable figure.

In this case, the data sampling pulses are provided by a real time data input clock generator 17, adapted to supply a train of 1024 clock pulses through a counter 176 and a clock select circuit 178 to both shift registers 172A and B. At the end of each data sampling interval, both shift registers 172A and B are full of 1024 data sampling pulses, corresponding to the digitized signals 162A and B of FIG. 12. The supply of data input pulses is then terminated by the counter 176 and the clock select circuit 178.

The data sampling interval is started when one of the digitized signals 162A or B goes from 0 to 1. This is brought about by supplying the digitized signals to a direction control circuit 180, which in turn is connected to the counter 176 to start the train of data input pulses.

The direction control circuit determines which of the digitzed signals 162A and B is leading and which is lagging. As shown in FIG. 12, the digitized signal 162A is leading.

The direction control circuit 180 has control connections to a clock control circuit 182, which in turn is connected to the clock select circuit 178. The clock control circuit 182 receives pulses from a recirculate or catch-up generator 184, which continuously generates control pulses, usually at a considerably faster rate than the real time pulses from the data input clock 174. Consequently, the catch-up clock pulses will sometimes be referred to as "fast pulses".

When the shift registers 172A and B are full, one of them will have an output of 1, while the other will have an output of 0. Assuming that the channel A digitized signal 162A is leading, the register 172A will have an output of 1, while the register 172B will have an output of 0.

When the registers 172A and B are full, the direction control 180, the clock control 182 and the clock select circuit 178 are effective to supply the fast catch-up pulses to whichever register contains the lagging signal, in this case the register 172B. At the same time, the register 172B is switched into its recirculate mode by a recirculate control circuit 186B. The register 172A has a similar recirculate control circuit 186A. Both recirculate control circuits 186A and B are under the control of the gate generator 188, which has control connections to the direction control circuit 180 and the clock select circuit 178.

The fast catch-up pulses cause the stored data sample pulses in the register 172B to be shifted or advanced, step by step, until the output of the shift register 172B goes to 1, the same as the output of the shift register 172A. This correlation between the outputs is detected by a correlator or comparator circuit 190, which is connected to the outputs of the shift registers 172A and B.

When such correlation occurs, the correlator 190 supplies an output pulse to the direction control circuit 180, which has the effect of stopping the supply of fast catch-up pulses to the shift register 172B.

It will be evident that the number of pulses required to shift the register 172B into correlation with the register 172A is a measure of the time shift or lapse between the digitized data signals 162A and B, as originally stored in the registers 172A and B. This train of fast catchup pulses is simply counted to provide a digital word corresponding to the time lapse or shift t. In this case the fast catch-up pulses are counted by a time interval counter circuit 192, to which the fast catch-up pulses are supplied through an error gate 194. It will be seen that the error gate 194 receives the fast pulses from the clock select circuit 178. The error gate 194 is open, so that the fast pulses are transmitted to the time interval counter 192, as long as the correlator 190 indicates that error exists between the outputs of the shift registers 172A and B. When the outputs of the registers 172A and B come into correlation, the correlator 190 produces an output signal which closes the error gate 194, so that the train of fast pulses to the time interval counter 192 is terminated.

As previously indicated, the velocity V is computed by dividing the time lapse t into a constant K, which represents the distance between the sensors A and B, and also a scale factor, which determines the units in which the velocity will be stated. Thus, in FIG. 13, the output from the time interval counter representing the time lapse t, is supplied to a divider circuit 194, which divides the digital word representing t into a digital word representing K. A K generator 196 supplies the divider circuit 194 with a digital word representing K. The operation of the k generator 196 is timed and controlled by a gate 198.

The quotient produced by the divider circuit 194 is stored in a divider counter 200 and is shown by a display 202, with the aid of a decoder 204.

The data sampling and computational cycle may be repeated at regular intervals so as to update the display of the velocity. Following each cycle, the various circuits may be reset, either automatically or manually.

The real time data input pulses may be at any desired or suitable rate. Thus, for example, they may be at the rate of 1000 per second. In that case, the data sampling cycle of the circuit shown in FIG. 13, requiring 1024 data sampling pulses, will require slightly over 1 second. It will be understood that the data input clock pulses may be at a much faster rate, or at a slower rate, as required.

It will be understood that the block diagram of FIG. 13 represents one electronic system for measuring the time lapse or shift t and computing the velocity V. Various other electronic systems may be employed, if desired.

FIGS. 14-19 constitute a circuit diagram of an electronic circuit for computing the velocity, in response to the output signals from the photoelectric sensors 32A and B of FIG. 1, or the radio wave sensors 72A and B of FIG. 5. The electronic computing circuit of FIGS. 14-19 corresponds generally to the block diagram of FIG. 13.

Thus, FIG. 14 illustrates a preamplifier and signal processing circuit 210A/B. It will be understood that two such circuits 210A and B are provided for amplifying and processing the signals from the photocells 38A and B. The circuits 210A and B can also be employed for amplifying and processing the signals from the radio receivers 90A and B of FIGS. 5-8.

In the circuit 210A/B of FIG. 14, preamplification is provided by a high gain operational amplifier 212 having its inverting input connected to the output of the photocell 38A/B, the non-inverting input of the amplifier 212 being grounded. Negative feedback resistors 214 and 216 are connected in series between the output and the inverting input of the amplifier 212. A small negative feedback capacitor 218 is similarly connected. To provide automatic gain control, the source and drain of a field effect transistor 220 are connected between ground and the junction between the resistors 214 and 216. The output of a gain control amplifier 222 is connected to the control electrode of the FET 220 through a potentiometer 224 which may be adjusted to regulate the automatic gain control action. A filtering capacitor 226 is connected between the control electrode and ground.

The output of the preamplifier 212 is connected to the inverting input of the gain control amplifier 222 through resistors 228 and 230, connected in series. A long time constant is provided by a filtering capacitor 232, connected between the junction of the resistors 228 and 230 and the negative power supply terminal 234. The time delay provided by the resistor 228 and the capacitor 232 imparts a slow, long-term action to the automatic gain control. A negative feedback resistor 234 is connected between the output and the inverting input of the gain control amplifier 222, the non-inverting input being grounded.

As the signal level at the output of the preamplifier 212 increases, the gain of the amplifier 212 is reduced by the action of the gain control amplifier 222 and the FET 220, in that the shunting action of the FET 220 is decreased, so that the negative feedback, afforded by the resistors 214 and 216, is increased.

The output signals from the preamplifier 212 are fed through a potentiometer 236 which may be employed to adjust the output level of the signals. The slider of the potentiometer 236 is connected through oppositely polarized diode rectifiers 238 and 240 to the inverting and non-inverting inputs of an operational amplifier 242, which effectively provides rectification, so that all of the output excursions in the signals from the amplifier 242 are in the same direction. Resistors 244 and 246 are connected between the inputs of the amplifier 242 and ground. A negative feedback resistor 248 is connected between the output and the inverting input of the rectifying amplifier 242.

A digitizing action is provided by a trigger circuit 250 having its input connected to the output of the rectifying amplifier 242. The trigger circuit 250 provides the squaring action described in connection with FIG. 12. To increase the steepness of the wavefronts, the output signals from the trigger circuit 150 are fed through two amplifiers 252 and 254 and a gate 256, connected in cascade. The output from the gate 256 corresponds to the digitized square wave signals 162A or B of FIG. 12. These signals are supplied to an output line 258A/B, labelled SENSOR A/B in FIG. 14. The sensor signal lines 258A/B appear again at the input end of FIG. 15.

To provide a signal indicator, a light emitting diode 260 is connected to the output of the trigger circuit 250 through an amplifying transistor 262. Resistors 264 and 266 are connected into the base and collector circuits for the transistor 262.

FIG. 15 illustrates shift register, correlator, direction control and gate circuits 270, which receive the digitized sensor signals A and B supplied by the lines 258A and B. It will be seen that the lines 258A and B are connected through amplifiers 272A and B to the data inputs of shift registers 274A and B, which may have any desired capacity, such as 1024 bits, for example.

The sensor signal lines 258A and B in FIG. 15 are also connected to the C inputs of directional control flipflops 276A and B. When a signal first appears on one of the lines 258A and B, the corresponding flipflop 276A or B is operated, to develop an output at its Q output terminal. The $\bar{Q}$ output terminals and the D input terminals of the flipflops 276A and B are cross-connected to latch the flipflops 276A and B. The SET inputs of the flipflops 276A and B are grounded, while the RESET inputs are connected to a control line 278, labelled INIT., standing for initialize. This control line 278 also appears in FIG. 16, to be described presently.

The Q outputs of the flipflops 276A and B are connected to output lines 280A and 280B, labeled DL, standing for Direction Left, and DR, standing for Direction Right. These lines are connected to the inputs of an OR gate 282, having an output line 284 labeld CLKEN, standing for Clock Enable. This clock enable control line 284 also appears in FIG. 16, which illustrates clock, clock control and counter circuits.

Thus, FIG. 16 shows a data input clock (DIC) 286, which provides real time pulses on an output line 288. The clock 286 comprises an integrated circuit 290 to which resistors 292 and 294 and a capacitor 296 are connected for timing purposes. The pulses produced by the data input clock 286 may be at any desired rate, such as 1000 per second, for example. Much higher and lower rates may be employed, if desired.

As shown, the clock pulse output line 288 and the control line 284 are connected to the inputs of an AND gate 298, which carries out the clock enabling function. Thus, when the data input clock is enabled, real time pulses appear at the output line 300 of the AND gate 298.

This output line 300, carrying the data input clock pulses, is connected to one input of another AND gate 302, which is initially open, but is used at a later stage to stop the supply of real time data input pulses. The output of the gate 302 goes to a line 304 which is labeled DIC GATED, indicating that the line 304 carries the gated data input pulses. This line 304 also appears in FIG. 15.

As shown in FIG. 15, the DIC gated line 304 is connected to one input of each of two OR gates 306A and B having their outputs connected through amplifiers 308A and B to the clock input of the shift registers 274A and B. During the data input portion of the cycle, the OR gates 306A and B are open, so that the real time data input clock pulses are supplied to the shift registers 274A and B. It will be understood that the shift registers 274A and B receive and store samples of the input data in the A and B channels for each of the data input clock pulses. When the shift registers 274A and B are full, the supply of real time data input clock pulses is terminated, so that such pulses are no longer supplied to the shift registers 274A and B.

Returning to FIG. 16, the real time data input clock pulses are counted by a counter 310 having its input supplied with such pulses by the output of an OR gate 312. One input of the OR gate is connected to the DIC gated line 304, to receive such pulses. The counter 310 counts to the capacity of the shift registers 274A and B, such as 1024 bits, for example, and then produces an output signal on an output line 314, labeled ENUF. As shown in FIG. 16, the line 314 is connected to one input of an AND gate 316, having its output connected to the A input of a clock control one-shot 318. The Q output of the one-shot 318 is connected to one input of an OR gate 320 having its output connected to the RESET terminal of the counter 310. The other input of the OR gate 320 is connected to the initialize control line 278. The signal supplied by the gate 320 to the counter 310 resets the counter 310.

At the same time, the Q output of the clock control one-shot 318 is connected to the RESET input of a clock rate select flipflop 322, which is effective to terminate the supply of real time data input pulses to the shift registers 274A and B.

For starting the data input cycle, the SET terminal of the clock rate select flipflop 322 is connected to the initialize line 278, which is switchable between a plus voltage and ground by an initialize switch 324. The Q output of the flipflop 322 is connected to the second input of the gate 302, which controls the supply of real time data input pulses to the DIC gated line 304. Initially, the clock rate select flipflop 322 operates the gate 302 to its open condition, so that the data input clock pulses will be supplied to the line 304, when the clock enable gate 298 is opened. When the flipflop 322 is reset by the signal supplied from the Q output of the one-shot 318, the gate 302 is closed, so that the data input pulses are no longer supplied to the shift registers 274A and B by way of the line 304.

For timing purposes, a resistor 326 and a capacitor 328 are connected to the clock control one-shot 318.

The circuits of FIG. 16 also include a catch-up clock 330 for generating fast catch-up clock pulses. The catch-up clock 330 utilizes an integrated circuit 322 to which resistors 334 and 336 and a capacitor 338 are connected, for timing purposes. The clock 330 supplies the catch-up pulses to an output line 340, labeled CUC, standing for catch-up clock. The line 340 is connected to the second input of the AND gate 316, and also to one input of an AND gate 342, having its output connected to a line 344 which is labeled CUC gated, indicating that this line carries the gated catch-up clock pulses. The opening of the gate 342 is controlled by the $\overline{Q}$ output of the clock rate select flipflop 322, such $\overline{Q}$ output being connected to a control line 346 labeled SCUC, standing for start catch-up clock. The line 346 is connected to one input of an AND gate 348 having its output connected to the second input of the gate 342. When the clock rate select flipflop 322 is reset, the gates 348 and 342 are opened, so that the catch-up pulses are supplied to the CUC gated line 344.

It will be seen that the CUC gated line 344 is also connected to the second input of the OR gate 312, having its output connected to the input of the counter 310. When the catch-up pulses are supplied to the line 344, they are transmitted by the gate 312 to the counter 310, so that they are counted. Thus, the counter 310 is first used for counting the data input clock pulses, during the data input cycle, and then for counting the catch-up clock pulses, during the catchup cycle.

The second input of the AND gate 348 is connected to a control line 350 which is labeled ERROR, indicating that this line receives an error signal. The line 350 is also labeled $\overline{DC}$, indicating that the error signal is the complement of DC, standing for data compare. The error or $\overline{DC}$ line 350 also appears in FIG. 15.

In FIG. 15, the CUC gated line 344 is connected to one input of each of two AND gates 352A and B, having their outputs connected to the second inputs of the OR gates 306A and B. During the data input portion of the cycle, the AND gates 352A and B are closed. During the catchup portion of the cycle, one of these gates is opened, as selected by the direction control flipflops 276A and B. In this way, catch-up pulses are supplied to whichever shift register 274A or B contains the lagging input data.

The start catch-up clock line 346 is connected to one input of each of two AND gates 354A and B having their outputs connected to the second inputs of the gates 352A and B. The outputs of the gates 354A and B are also connected through amplifiers 356A and B to the recirculate control inputs of the shift registers 274A and B. A second input of the AND gate 354A is connected to the Q output of the direction control flipflop 276B. It will be noted that this constitutes a cross-connection between the A and B circuits. Likewise, the second input of the AND gate 354B is connected to the Q output of the direction control flipflop 276A. Thus, the initial triggering of either direction control flipflop 276A or B conditions the gate 354B or A of the other channel to cause the supply of the catch-up clock pulses to the shift register 274B or A of the other channel during the catchup portion of the cycle. When the gate 354A or B is opened by the start catch-up clock signal on the line 346, the corresponding gate 352A or B is opened to transmit the catch-up clock pulses to the corresponding shift register 274A or B. At the same time, such shift register 274A or B is switched into its recirculate mode by the signal transmitted through the corresponding amplifier 356A or B.

For clarity of explanation, it will be assumed that the leading input data signal is stored in the shift register 274A, while the lagging signal is stored in the register 274B. For the opposite direction of the velocity, the opposite situation would be true. For the stated assumption, the data bits stored in the register 274B lag behind the data bits stored in the shift register 274A by a certain number of data bits, corresponding to the number of real time data input clock pulses representing the time lapse or shift t. During the catch-up portion of the cycle, the catch-up clock pulses cause the shift register 274B to advance its data by the same number of data bits, until the output of the shift register 274B comes into correlation with the output of the shift register 274A.

Such correlation is detected by a correlator 360 having its inputs connected to the outputs of the shift registers 274A and B through inverting amplifiers 362A and B. It will be seen that load resistors 364A and B are connected to the amplifiers 362A and B. The output of the correlator 360 is connected to the error or $\overline{DC}$ line 350. Thus, the correlator 360 supplies a signal to the line 350 as long as error exists between the outputs of the shift registers 274A and B. When these outputs become the same, the error signal is no longer supplied to the line 350.

As shown in FIG. 15, an inverting amplifier 366 is connected between the error line 350 and an output line 368, labeled DC, standing for data compare. This data compare line 368 provides a signal when the outputs of the shift registers 274A and B become the same. The DC line 368 also appears in FIG. 17.

As previously mentioned, the counter 310 of FIG. 16 counts the catch-up pulses, until they are terminated by the application of the error signal along the line 350 to the gate 348. This results in the closing of the gates 348 and 342, so that the catch-up pulses are no longer supplied to the counter 310. The count remains in the counter 310 until the counter is reset by the initialize signal on the line 278. This count is a direct measure of the time lapse or shift t. The count is stored in the counter 110 as a binary word. To compute the velocity V, this binary word is divided into another binary word representing the constant K. The binary word representing the time lapse or shift t appears at the ten parallel outputs of the counter 310. These ten parallel outputs, which appear in FIG. 16, and also in FIG. 18, are collectively designated 370 and are individually identified as $t_0$ through $t_9$.

FIG. 17 illustrates a K generator circuit 372 for generating a binary word corresponding to the constant K.

FIG. 18 illustrates a divider circuit 374 for dividing the binary word representing the time lapse t into the binary word representing the constant K.

FIG. 19 illustrates a display circuit 376 for displaying the quotient, representing the velocity V.

The K generator 372 of FIG. 17 is a switchable, fully decoded counter circuit which counts out and supplies a switchable number of K pulses, derived from the catch-up clock pulses. Thus, the counter employs four counter stages 380L, M, N and P, connected in a conventional counter circuit. The switchable decoding is accomplished by sixteen switches, collectively designated 382 and individually identified as 0 through 15. The switches 382 determine the number of K pulses in the binary word. The switches are set to produce the desired number of K pulses, corresponding to the distance d and the desired scale factor, such as inches per second, feet per second, miles per hour, and the like.

The catch-up clock pulses are supplied to the K generator of FIG. 17 by the CUC output line 340, which also appears in FIG. 16. The catch-up clock pulses are always on this line. It will be seen that the CUC line 340 is connected to one input of an OR gate 384, having its output connected to the count input of the first counter stage 380L. The gate 384 is opened in response to the data compare signal, and is closed when the K generator counters 380L-P count out the desired number of K pulses.

To control the gate 384, its second input is connected to the $\overline{Q}$ output of a first control flipflop 386, having its C input connected to the DC or data compare line 368, which is also shown in FIG. 15. The $\overline{Q}$ output of the flipflop 386 is also connected to the R input of a second control flipflop 388, having its D input connected to the Q output of the flipflop 386. The C input of the flipflop 388 is connected to the $Q_A$ output of the counter stage 380L. The Q output of the flipflop 388 is connected to one input of an AND gate 390 having its other input connected to the output line 392 of the counter stages 380L-P.

The output of the AND gate 390 is connected to one input of an OR gate 394, having its output connected to the R input of the first control flip-flop 386. This gate 394 transmits a signal which resets the flipflop 386 to close the gate 384 and terminate the train of K pulses, when the desired number of pulses has been counted by the counter stages 380L-P. The other input of the gate 394 is connected to a control line 396 labeled SDIC, standing for Start Data Input Clock, which also appears in FIG. 16 and is connected to the Q output of the clock rate select flipflop 322. The SDIC line 396 is also connected to the reset terminals of the counter stages 380L-P. Thus, the appearance of a signal on the line 396 resets the counter stages 380L-P simultaneously with the starting of the data input clock pulses.

The desired train of K pulses appears on a line 400 connected to the output of the OR gate 384. This line 400 appears in both FIGS. 17 and 18 and is labeled "K" pulses.

The divider circuit 374 of FIG. 18 comprises three counter stages 402R, S and T, connected into a conventional division circuit. As previously indicated, the binary word corresponding to the time lapse or shift t is supplied by the counter 310 of FIG. 16, along the parallel output lines 370, which are connected to the counter stages 402R–T, as shown in FIG. 18. The train of K pulses produced by the K generator 372 of FIG. 17 is supplied along the K pulse line 400 to the serial input of the first counter stage 402R. The output of the divider circuit 374 appears on a quotient output line 404, labeled QUO=V. This line 404 appears in both FIGS. 18 and 19. The reset inputs of the counter stages 402R-T are connected to the initialize line 278, so that the divider circuit will be reset when the velocity measuring circuit is initialized. The initialize line 278 also appears in FIG. 16.

The display circuit 376 of FIG. 19 comprises a counter circuit 406 for storing the binary word representing the quotient or velocity. The counter circuit 406 comprises five counter stages 408A–E, connected into a conventional counter circuit.

The parallel outputs of the counter stages 408A–E are connected through individual amplifiers 410 to five display modules 412A–E, which may be of the type manufactured by Hewlitt-Packard, or any other suitable type. The reset inputs of the counter stages 408A–E are connected to the initialize line 278, so that the counters will be reset when the velocity measuring circuit is initialized.

The velocity measured by the system is displayed as a decimal number by the display modules 412A–E. The velocity may be in any desired units corresponding to the setting of the K generator 372 of FIG. 17.

FIG. 20 illustrates a rotary switch circuit 420 which may be added as an optional feature to the K generator 372 of FIG. 17, so as to make it easy to switch between three different sets of units, such as inches/second, feet/second and miles/hour, for example. The rotary switching circuit 420 comprises an assembly of three-position ganged rotary switches, designated collectively as 422 and identified individually as 0, 1, 2, 3, 4, 5, 6, 7, 8, 10, 11, 13, 14, 15 and DP. The individually numbered switches 422 are connected in parallel with the correspondingly numbered switches of FIG. 17, the switch DP being connected to the DP terminal of the counter stage 380P in FIG. 17.

The rotary switching circuit 420 of FIG. 20 is used by first setting all of the switches 382 of FIG. 17 to 1, which is the connection to the voltage supply terminal 424, except for the switch 382-12, which is set to 0, comprising the grounded terminal. To prevent short circuiting of the voltage supply terminal 424 of FIG. 17, sixteen individual decoupling resistors should be connected between the voltage supply terminal 424 and the corresponding terminals of the sixteen switches 382.

The rotary switches 422 of FIG. 20 make all of the necessary changes between 1 and 0, as required to adjust the number of K pulses for the three sets of units, inches/second, feet/second and miles/hour.

FIGS. 21–24 illustrate a range measuring system 430 utilizing a velocity measuring system 432 to measure the range or distance from the measuring station to a more or less distant target 434. The velocity measuring system 432 may be the same as the velocity measuring system 30 of FIG. 1, employing light as the received radiation. Alternatively, the velocity measuring system 432 may be the same as the system 70 of FIGS. 5–8, utilizing radio waves as the received radiation. In either case, the velocity computing circuits of FIGS. 13–19 may be employed.

The range measuring system 430 of FIGS. 21–24 involves scanning the velocity measuring system 432 across the target 434 so as to produce apparent relative velocity, which is measured by the velocity measuring system 432. At the same time, the scanning rate is observed and measured. The scanning rate is divided into the measured velocity to compute the range.

In the range measuring system 430 of FIGS. 21–24, the velocity measuring system is scanned by mounting it on a rotatable platform or turntable 436, so that it is rotatable about an axis 438 which is perpendicular to the parallel paths along which the radiation is received. Preferably, the axis 438 is midway between such paths. A shaft angle encoder 440 is connected to the rotatable platform 436 to measure the angular position $\theta$ of the velocity measuring system 434. Preferably, the encoder 440 is of the type which expresses the angle $\theta$ as a multi-digit electronic binary word. The encoder 440 is supported on a suitable base 442, which may utilize a tripod 444, for example.

The velocity measuring system 432 may be scanned across the target 434 by oscillating the platform 436 back and forth about its axis 438, either manually or mechanically. The encoder 440 provides a rapidly changing binary word, indicating the instantaneous angle $\theta$. Meanwhile the velocity measuring system 432 produces a binary word representing the velocity.

The rate of change of the angle $\theta$ is computed by an electronic rate detector 446, having its input connected to the output of the encoder 440. The rate detector 446 computes the angular rate of change of $\theta$ with reference to time base pulses supplied by a time base pulse generator 448. The rate detector 446 provides an output in the form of a binary word representing the angular rate $\dot{\theta}$. Such angular rate is supplied to a digital divider 450, which divides the angular rate $\dot{\theta}$ into the velocity V, received from the velocity measuring system 432. The quotient is a binary word representing the range R, which is supplied to a display 454 adapted to display the range in any desired units, such as inches, feet, miles or the like.

The diagram of FIG. 24 illustrates the mathematical principles involved in this range measuring system 430. The symbols employed in FIG. 24 are as follows:
$\theta$ = displacement angle in radians.
s = tangential traverse in feet.
R = radius or range in feet.
V = velocity in feet per second.
$\dot{\theta}$ = angular velocity in radians per second.

If the platform 436 is rotated or oscillated through a small angle $\theta$, the following equations will be true:
s = R$\theta$
ds/dt = R (d$\theta$/dt)
V = ds/dt
$\dot{\theta}$ = d$\theta$/dt
V = R$\dot{\theta}$
R = V/$\dot{\theta}$ It is preferred to operate the range finding system 430 by causing the platform 436 to oscillate back and forth across one pointing angle aimed at the target, and to average the velocity measured in each direction of oscillation. In this way, the range to a moving target can be determined. In addition, by measuring the velocity V with $\dot{\theta}$ = 0, the relative velocity between the target and the velocity measuring system 432 can be determined.

FIGS. 25–27 illustrate a dimension measuring system 460 for measuring the dimensions of a more or less distant object or target, without any necessity of touching the surface being measured, and without having to be within any specific distance of such surface. The dimension measuring system 460 utilizes a velocity measuring system 462, which is preferably of the optical type, represented by the velocity measuring system 30 of FIG. 1, using light as the received radiation, but may also be the same as the velocity measuring system 70 of FIGS. 5–8, employing radio waves as the received radiation. The velocity measuring system 462 measures velocity along a transverse direction, normal to a line of sight. The dimension measuring system 460 is operated by moving the velocity measuring system 462 in such transverse direction, while aiming it at a target or object 464 to be measured. The velocity measuring system 462 is moved a sufficient distance to cause it to scan the target 464. While moving the velocity measuring system 462, the instantaneous velocity V is integrated with respect to time by an electronic integrator 466, to which the velocity signal is supplied. The integration is carried out with respect to a time standard 468, which may be in the form of a time base pulse generator, connected to the integrator 466. The integrated distance or dimension s is supplied to a readout or display 470, which displays the dimension in terms of feet or any other units.

While the dimension measuring system 460 may be mounted on any suitable vehicle, FIG. 26 shows the dimension measuring system 460 as a hand held device which the user points at the target or surface 464 to be measured. Such surface may be the outside of a building, as illustrated in FIG. 27. The dimension measuring system 460 comprises an actuation switch 472, which is depressed or otherwise operated by the user at the starting point, whereupon the user walks to the stopping point and releases the switch 472. The device 460 then computes the dimension and displays it on the readout 470.

For accuracy, the only requirement is that the device 460 be aimed to look at the end of the surface at the same angle that it looks at the beginning of the surface. The distance from the surface makes no difference, within the capability of the lens system employed in the velocity measuring device 462.

FIG. 27 illustrates several different possible measurement paths 476 for the scanning of the target 464 by the dimension measuring system 460. These paths do not need to be straight to maintain the accuracy of the measurement, because the system 460 measures the component of velocity along the direction of movement.

I claim:

1. In a velocity measuring system for measuring the velocity of a craft in flight over terrain,
    said system comprising first and second directional receiving devices on the craft for receiving radiation from the terrain,
    means supporting said first and second directional receiving devices on the craft with said devices aimed along respective first and second parallel radiation paths which are spaced apart by a predetermined distance along a predetermined direction,
    each of said receiving devices including electrical signal producing devices for converting the received radiation into corresponding electrical signals,
    said signal producing devices being effective to produce signal features corresponding to any radiation features of the radiation received from the terrain,
    the velocity of the craft in said direction being effective to produce a time lapse between the signal features from the signal producing devices of said first and second receiving devices,
    and time lapse measuring means connected to said signal producing devices of said first and second receiving devices for determining the time lapse between the electrical signal features produced by said first and second receiving devices,
    the velocity of the craft as represented by said time lapse being inversely proportional to said time lapse,
    the improvement in which said time lapse measuring means comprise first and second digitizers for producing first and second digitized signals corresponding to said electrical signals from said first and second receiving devices,
    first and second shift registers for storing said digitized signals,
    the stored signals in one of said registers being leading while the stored signals in the other register are lagging due to said time lapse,
    circulator means for circulating the lagging signals in the corresponding shift register to bring said signals into correlation with said leading signals,
    correlator means connected to said first and second shift registers for detecting such correlation and stopping said circulator means,
    and means for measuring the amount of circulation produced by said circulator means,
    said amount of circulation being a measure of said time lapse.

2. A velocity measuring system according to claim 1, including divider means for dividing said time lapse into a constant to produce a quotient representing the velocity.

3. A velocity measuring system according to claim 2, including readout means for reading out said quotient.

4. In a velocity measuring system for measuring the velocity of a craft in flight over terrain,
    said system comprising first and second directional receiving devices on the craft for receiving radiation from the terrain,
    means supporting said first and second directional receiving devices on the craft with said devices aimed along respective first and second parallel radiation paths which are spaced apart by a predetermined distance along a predetermined direction,
    each of said receiving devices including electrical signal producing devices for converting the received radiation into corresponding electrical signals,
    said signal producing devices being effective to produce signal features corresponding to any radiation features of the radiation received from the terrain,
    the velocity of the craft in said direction being effective to produce a time lapse between the signal features from the signal producing devices of said first and second receiving devices,
    and time lapse measuring means connected to said signal producing devices of said first and second receiving devices for determining the time lapse between the electrical signal features produced by said first and second receiving devices,
    the velocity of the craft as represented by said time lapse being inversely proportional to said time lapse,
    the improvement in which said time lapse measuring means comprise first and second digitizers for producing first and second digitized signals corresponding to said electrical signals from said first and second receiving devices,
    data sampling and storage means including first and second shift registers for storing said digitized signals,
    said data sampling and storage means including a data input clock for supplying data sampling pulses to said first and second shift registers,
    the stored signals in one of said registers being leading while the stored signals in the other register are lagging due to said time lapse,
    circulator means including a catch-up clock for supplying catch-up pulses to said other register for circulating the lagging signals to bring them into correlation with the leading signals,
    correlator means connected to said first and second shift registers for detecting such correlation and stopping said circulator means,
    and a counter for counting the number of catch-up pulses required to bring about such correlation,
    the count registered by said counter being a measure of the time lapse.

5. A velocity measuring system according to claim 4, including divider means for dividing said count into a constant to produce a quotient representing the velocity.

6. A velocity measuring system according to claim 4, including a constant generator for producing a digital word corresponding to a constant representing said predetermined distance and a scale factor, and a divider for dividing said count into said digital word to produce a quotient representing the velocity.

7. A velocity measuring system according to claim 6, including a display for displaying said quotient.

8. A range measuring system,
comprising first and second directional sensors for receiving radiation from a field,
supporting means supporting said first and second directional sensors with said sensors aimed along respective first and second parallel radiation paths which are spaced apart by a predetermined distance in a predetermined direction,
said directional sensors including first and second electrical signal producing means for converting the received radiation into corresponding first and second electrical signals,
said signal producing means being effective to produce signal features corresponding to any radiation features of the received radiation due to features of said field,
a rotatable member supporting said supporting means for rotation about an axis perpendicular to a plane defined by said parallel radiation paths,
angular velocity measuring means for measuring the angular velocity of said supporting means,
said angular velocity producing transverse relative velocity between said directional sensors and said features of said field along said predetermined direction,
said transverse relative velocity being effective to produce a time lapse between the signal features from said first and second directional sensors,
time lapse measuring means connected to said first and second signal producing means for measuring said time lapse,
a divider for dividing said time lapse into a constant to produce a first quotient representing said transverse relative velocity,
and means for dividing said angular velocity into said transverse velocity to produce a second quotient representing the range between said sensors and said features of said field.

9. A range measuring system according to claim 8,
in which said first and second directional sensors include first and second lens means for focusing light radiation,
said first and second lens means having first and second parallel optical axes coinciding with said first and second parallel radiation paths,
said first and second signal producing means comprising first and second photoelectric devices for converting the focused light radiation into the first and second electrical signals.

10. A range measuring system according to claim 8,
in which said angular velocity measuring means include an encoder for producing first binary signals representing the angular position of said supporting means,
and a rate detector for converting said first binary signals into second binary signals representing the angular velocity of said supporting means.

* * * * *

UNITED STATES PATENT AND TRADEMARK OFFICE
CERTIFICATE OF CORRECTION

PATENT NO.   : 4,167,330
DATED        : September 11, 1979
INVENTOR(S)  : George Douglas Haville It is certified that error appears in the above–identified patent and that said Letters Patent are hereby corrected as shown below:

Column 4, line 22, "of" should be -- or --

Column 6, line 35, "ultra-light" should be -- ultra-high --

Column 6, line 64, "current" should be -- crystal current --

Column 7, line 37, "51-8" should be -- 5-8 --

Column 8, numbered line 20, "$\alpha = \tan(V_x/V_y)$" should be -- $\alpha = \text{arc tan}(V_x/V_y)$ --

Column 8, line 41, "data" should be -- data sample --

Column 10, line 60, "k" should be -- K --

Column 12, line 13, "150" should be -- 250 --

Column 13, line 61, "322" should be -- 332 --

Signed and Sealed this

Fourth Day of December 1979

[SEAL]

Attest:

SIDNEY A. DIAMOND

Attesting Officer

Commissioner of Patents and Trademarks